United States Patent [19]

Uchino

[11] Patent Number: 5,566,061
[45] Date of Patent: Oct. 15, 1996

[54] POWER CONVERSION SYSTEM AND CONTROL DEVICE THEREFOR

[75] Inventor: Hiroshi Uchino, Tokyo, Japan

[73] Assignee: Kabushiki Kaisha Toshiba, Kawasaki, Japan

[21] Appl. No.: 338,181

[22] Filed: Nov. 9, 1994

[30] Foreign Application Priority Data

| Nov. 9, 1993 | [JP] | Japan | 5-278768 |
| Jan. 31, 1994 | [JP] | Japan | 6-008923 |
| Feb. 28, 1994 | [JP] | Japan | 6-030342 |

[51] Int. Cl.$^6$ .............. H02M 3/28; H02M 3/31; H02M 3/33
[52] U.S. Cl. ................. 363/71; 363/31
[58] Field of Search ................ 363/31, 71

[56] References Cited

U.S. PATENT DOCUMENTS

| 4,488,215 | 12/1984 | Pfaff et al. | 363/96 |
| 5,070,440 | 12/1991 | Walker . | |
| 5,083,039 | 1/1992 | Richardson et al. | 290/44 |
| 5,285,145 | 2/1994 | Minowa et al. | 318/808 |
| 5,285,371 | 2/1994 | Sanada et al. | 363/71 |

OTHER PUBLICATIONS

IEEE Transactions on Industry Applications, vol. 28, No. 5, Sep./Oct. 1992, pp. 1023–1030, Satoshi Ogasawara, et al., "A Novel Control Scheme of a Parallel Current–Controlled PWM Inverter".

Primary Examiner—Stuart N. Hecker
Attorney, Agent, or Firm—Oblon, Spivak, McClelland, Maier & Neustadt, P.C.

[57] ABSTRACT

A control device for a power conversion system with a plurality of power converters, each of which is provided with a DC power source, a DC reactor and a unit converter composed of self-turn-off switching devices with DC terminals connected to the DC power source through the DC reactor, in which AC terminals of the plurality of unit converters are connected in common and is connected to an AC load. The control device includes a first unit for generating an instruction value vector for an AC output current of the power conversion system, a second unit for generating a set of actual value vectors showing all of the AC output currents that can be generated by the power conversion system, a third unit for selecting a closest actual value vector that is closest to the instruction value vector out of the set of the actual value vectors, and a fourth unit for controlling the self-turn-off switching devices in the unit converters in response to the closest actual value vector. The AC output current of the power conversion system is thereby controlled so as to track the instruction value vector.

11 Claims, 17 Drawing Sheets

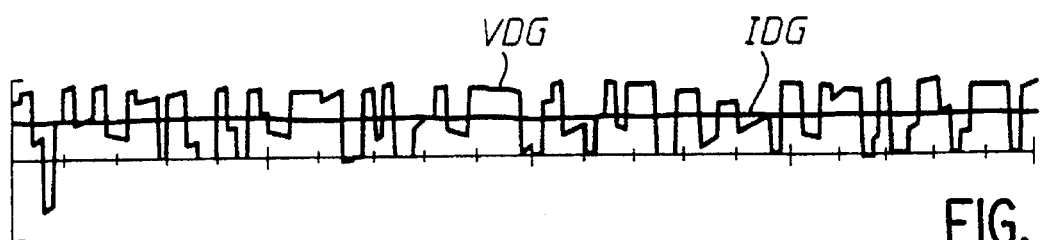
FIG. 9A
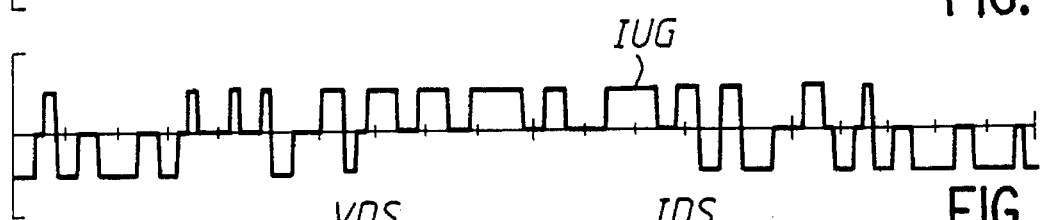
FIG. 9B
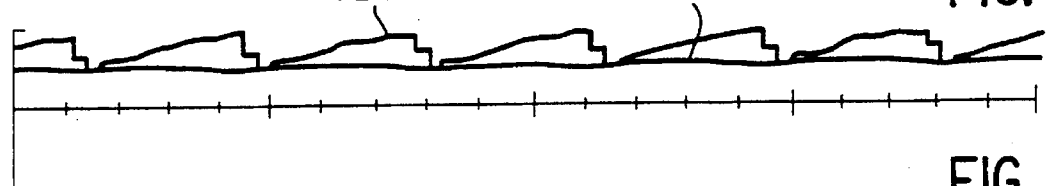
FIG. 9C
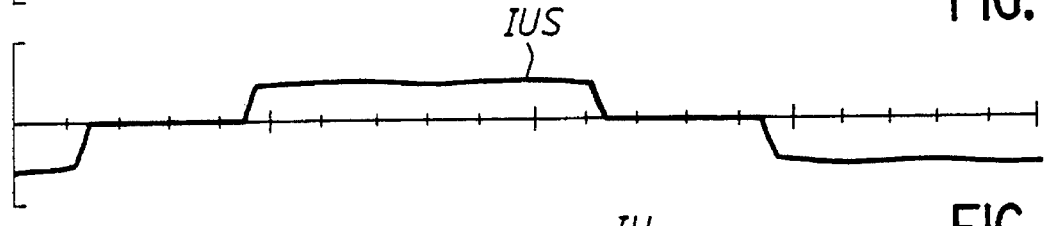
FIG. 9D
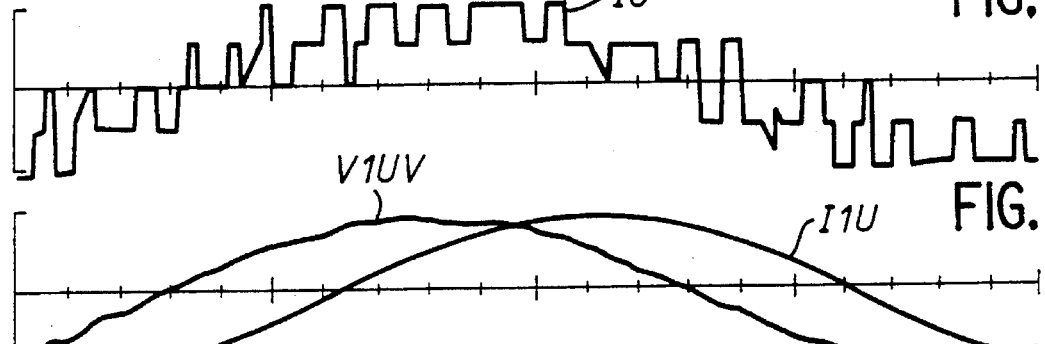
FIG. 9E
FIG. 9F
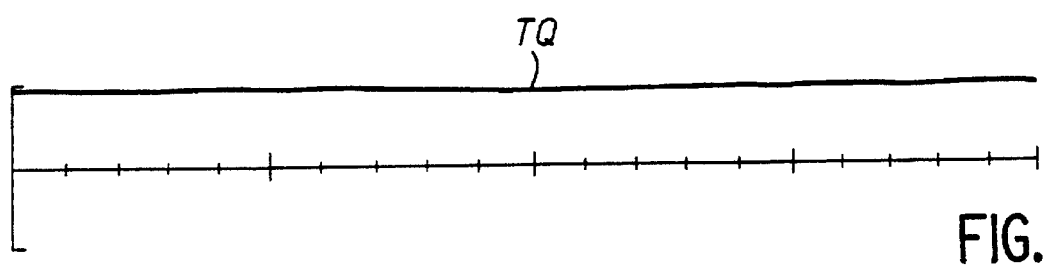
FIG. 9G

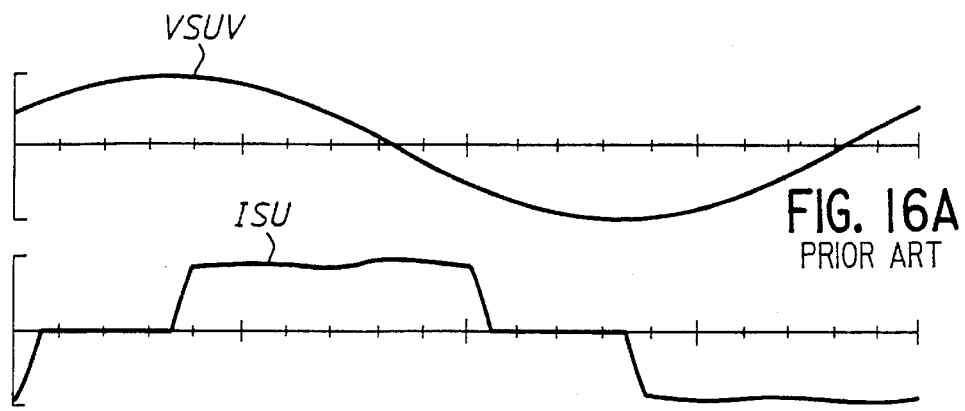
FIG. 16A PRIOR ART
FIG. 16B PRIOR ART
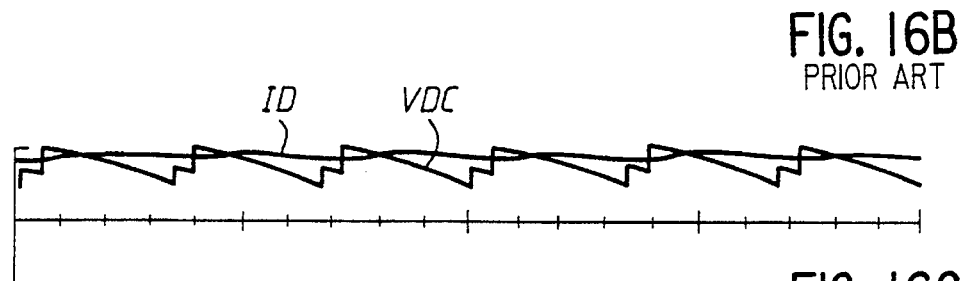
FIG. 16C PRIOR ART
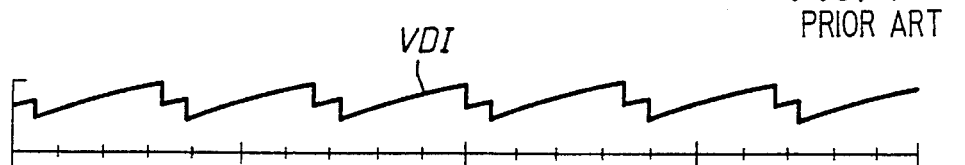
FIG. 16D PRIOR ART
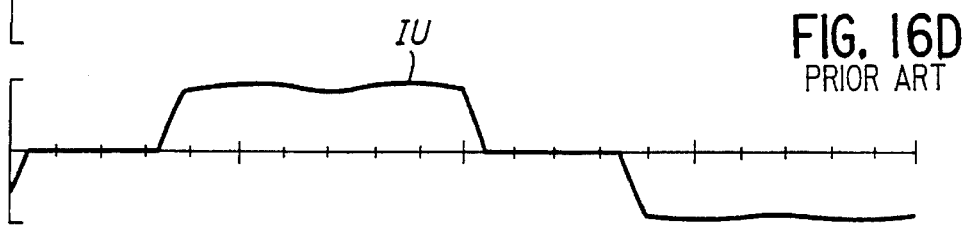
FIG. 16E PRIOR ART
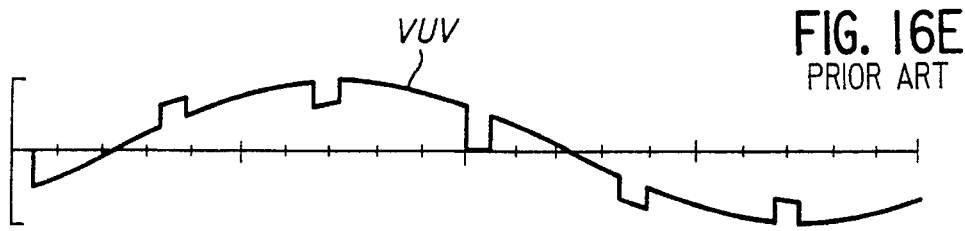
FIG. 16F PRIOR ART
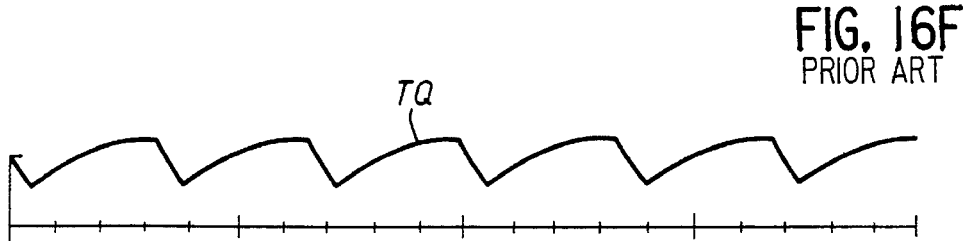
FIG. 16G PRIOR ART

POWER CONVERSION SYSTEM AND CONTROL DEVICE THEREFOR

BACKGROUND OF THE INVENTION

1. Field of the Invention

This invention relates to a power conversion system, and more particularly to a current source power conversion system.

This invention also relates to a control device for a power conversion system with a plurality of unit converters whose AC terminals are connected in common, and more particularly to a control device for a power conversion system which controls the total AC output current of the power conversion system to an instruction value.

2. Description of the Related Art

FIG. 3 is a layout diagram of the main circuitry of a power conversion system in which a prior art example and this invention are applied in common. In FIG. 3, 1 is an AC load and 2 to 4 are capacitors. 5 to 8 are unit converters (hereinbelow simply called converters) that convert DC power to AC power. Parallel operation of converters 5 to 8 is performed by connecting their respective AC terminals in common to AC load 1. Capacitors 2 to 4 are employed for absorbing the switching surges of converter 5 to converter 8. 9 to 32 are self-turn-off switching devices that constitute converter 5 to converter 8. Hereinbelow, the case will be described in which gate turn-off thyristors (hereinbelow simply called GTOs) are employed as self-turnoff switching devices. 33 to 40 are DC reactors for smoothing the DC current. 41 to 44 are DC power sources.

FIG. 13 is a layout diagram of a prior art control circuit for controlling the power conversion system shown in FIG. 3. In FIG. 13, 69 is a current instruction value generating circuit for converter 5 to convertor 8, 70 is a phase detecting circuit, 71 is a triangular wave generator, 72 is a comparator, and 73 is a logic circuit for generating output instructions of the AC currents of converter 5 to converter 8.

FIG. 14 is a waveform diagram of the case where the power conversion system shown in FIG. 3 is controlled by the prior art control circuit shown in FIG. 13.

Hereinbelow, the operation of this prior art control circuit will be described with reference to FIG. 3, FIG. 13 and FIGS. 14A–E.

In FIG. 13, current instruction value generating circuit 69 generates an amplitude instruction value S1 and a phase angle instruction value of the AC current. Amplitude instruction value S1 is supplied to comparator 72. Phase angle instruction value is supplied to phase detection circuit 70 and triangular wave generator 71. Signals S2 to S5 are The output signals of triangular wave generator 71 and are triangular waves whose period is 60° of the phase angle instruction value. Triangular waves S3 to S5 are respectively lagging in phase by 15° in each case with respect to triangular wave S2. Comparator 72 compares amplitude instruction value S1 with triangular waves S2 to S5, and provides an output instruction of AC current in the range where the amplitude instruction value is larger than the triangular wave. Output instruction from comparator 72 and output of phase detection circuit 70 are supplied to logic circuit 73, which generates AC current output instructions for each converter by performing phase discrimination by means of the output of phase detection circuit 70. Specifically, S6 is s U phase output instruction of converter 5, S7 is an X phase output instruction of converter 5, S8 is a U phase output instruction of converter 6, S9 is an X phase output instruction of converter 6, S10 is a U phase output instruction of converter 7, S11 is an X phase output instruction of converter 7, S12 is a U phase output instruction of converter 8, and S13 is an X phase output instruction of converter 8.

Current of the waveform shown at S14 of FIGS. 14A–E is obtained as U phase output current by on/off control of GTOs 9–32 of converter 5 to converter 8 in accordance with the above output instructions S6–S13. Identical control is performed in respect of the V phase and W Phase, with their respective phases being made to lag by 120° in each case with respect to the U phase.

As described above, when operation is performed with the AC terminals of converter 5 to converter 8 connected in parallel and with the conduction phases of the GTOs respectively lagging by 15° in each case, the waveform of the output current of the power conversion system i.e. the resultant value of the output currents of the converters is a square-wave waveform as shown at S14 of FIGS. 14A–E, containing low-order, fifth and seventh higher harmonics.

Next, another power conversion system is described.

FIG. 15 is a layout diagram of a prior art example of a power converter. In this Figure, 101 is a power source, 102 is a transformer, 103 is a converter that converts AC power to DC power, 104 is an inverter that converts DC power to AC power, 105 is a DC reactor that smooths the DC current that flows from converter 103 to inverter 104, 107 to 112 are thyristors constituting converter 103, 113 to 118 are thyristors constituting inverter 104, 119 is a control circuit of converter 103, 120 is a control circuit of inverter 104, and 164 is a synchronous motor. Converter 103 and inverter 104 constitute a so-called externally commutated current source power converter, in which DC current smoothed by a DC reactor 105 is commutated and converted to AC current depending on an AC voltage.

FIGS. 16A–G is a waveform diagram illustrating the action of the prior art example shown in FIG. 15. In this Figure, VSUV (FIG. 16(A)) is a voltage between U and V phases of power source 101. A VW between-phase voltage and a WU between-phase voltage have the same waveform as voltage VSUV, lagging in phase by 120° and 240°, respectively. ISU (FIG. 16(B)) is a current flowing in the U phase of converter 103. The same currents ascurrent ISU also flow in the V phase and W phase of converter 103, but lagging in phase by 120° and 240° with respect to current ISU, respectively. VDC is a DC output voltage of converter 103, and ID is a current flowing in the DC circuit (FIG. 16(C)). VDI is a DC input voltage of inverter 104 (FIG. 16(D)). IU (FIG. 16(E)) is a current that is supplied to the U phase of synchronous motor 164 from the U phase of inverter 104. The same currents as current IU also flow in the V phase and W phase of inverter 104, but lagging in phase by 120° and 240° with respect to current IU, respectively. VUV (FIG. 16(F)) is a UV between-phase voltage of inverter 104. The VW between-phase voltage and the WU between-phase voltage of inverter 104 have the same waveform as voltage VUV, but lagging in phase by 120° and 240°, respectively. TQ is a torque generated by synchronous motor 164 (FIG. 16(G)).

In the construction of the prior art example described above, converter 103 and inverter 104 are constituted by thyristor converters. Thyristors have the advantages that they allow large current to flow with low forward voltage in the ON condition and that they show little switching loss.

Using these thyristors, high-voltage large-capacity power converters of high efficiency and small size can be manufactured cheaply. Furthermore, the stress on the devices during switching is small, leading to high reliability. That is, the externally-commutated power converter as shown in FIG. 15 has considerable advantages in comparison with self-commutated power converters, wherein the converter itself is also large, and which are of high cost with the increase of switching loss.

However, since, with the thyristors used in the circuit shown in FIG. 15, commutation is performed depending on an AC voltage as they have no self-turn-off capability, the thyristor converter consumes lagging reactive power. When a thyristor converter is employed for control of an AC motor, a synchronous motor must therefore be used which is operated in a leading-phase region, so that lagging reactive power is supplied by the synchronous motor. However, since the current waveform flowing in the synchronous motor is a square wave as shown by IU in FIG. 16(E), the torque generated by the synchronous motor has a large pulsating component as shown by TQ of FIG. 16(G). This may cause vibration and/or noise due to resonance.

SUMMARY OF THE INVENTION

Accordingly, one object of this invention is to provide a control device for a power conversion system composed of a plurality of converters which can eliminate low-order higher harmonics by controlling the total AC output current thereof to an instruction value.

Another object of this invention is to provide a power conversion system composed of a plurality of converters which can supply power with little pulsation to a load or a power source.

These and other objects of this invention can be achieved by providing a control device for a power conversion system with a plurality of power converters, each of which is provided with a DC power source, a DC reactor and a unit converter composed of self-turn-off switching devices with DC terminals connected to the DC power source through the DC reactor, in which AC terminals of the plurality of unit converters are connected in common and is connected to an AC load. The control device includes a first unit for generating an instruction value vector for an AC output current of the power conversion system, a second unit for generating a set of actual value vectors showing all of the AC output currents that can be generated by the power conversion system, a third unit for selecting a closest actual value vector that is closest to the instruction value vector out of the set of the actual value vectors, and a fourth unit for controlling the self-turn-off switching devices in the unit converters in response to the closest actual value vector. The AC output current of the power conversion system is thereby controlled so as to track the instruction value vector.

According to one aspect of this invention, there is provided a control device for a power conversion system with a plurality of power converters, each of which is provided with a DC power source, a DC reactor and a unit converter with DC terminals connected to the DC power source through the DC reactor, in which AC terminals of the plurality of unit converters are connected in common and is connected to an AC load. The control device includes a current instruction value generating unit for generating three phase AC current instruction values for the power conversion system, a current phase detecting unit for detecting a maximum phase during a predetermined time period in which one of absolute values of the three phase AC current instruction values in maximum, and for generating the maximum phase and a polarity of the AC current instruction value of the maximum phase, a conduction arm number calculating unit for determining numbers of conduction arms in the unit converters in each of three phases, based on the ratios of the respective three phase AC current instruction values and DC current of the DC power source, respectively, and a conduction arm calculating unit connected to receive the maximum phase, the polarity and the numbers of the conduction arms for generating a conduction instruction to the unit converter. The conduction arm calculating unit includes a maximum phase current control unit for generating a first conduction instruction for turning ON all arms of the unit converters decided by the maximum phase and the polarity, an AC current control unit for generating a second conduction instruction for sequentially turning ON arms of the unit converters of one phase of the remaining two phases which are not the maximum phase, and sequentially turning OFF the arms of the unit converters of the other phase, and a bypass current control unit for generating s third conduction instruction for turning ON an arm connected in series with the arm turned ON by the first conduction instruction in response to a sum of conducting arms of the remaining two phases in each of the unit converters. The conduction instruction includes the first, the second and the third conduction instructions, and the output currents of the power conversion system is thereby controlled so as to track the three phase AC current instruction values.

According to another aspect of this invention, there is provided a power conversion system including a first current source power converter having a first converter and a first inverter and a second current source power converter having a second converter and a second inverter. The second inverter is a self-commutated inverter. An input of the first converter and an input of the second converter are connected to a power source. A capacitor is connected to an output of the first inverter and an output of the second inverter, and is connected to one of a load and a power system. The power conversion system further includes a current calculation unit for detecting a distortion component of a current flowing into one of the load and the power system and for calculating an output current reference of the second inverter such as to eliminate the distortion component, and an inverter control unit for controlling the second inverter based on the output current reference.

According to still another aspect of this invention, there is provided a power conversion system including a first current source power converter having a first converter and a first inverter, and a second current source power converter having a second converter and a second inverter. The second converter is a self-commutated converter, and the second inverter is a self-commutated inverter. A first capacitor is connected to an AC input of the first converter and an AC input of the second converter, and is connected to a first power source. A second capacitor is connected to an AC output of the first inverter and an AC output of second inverter, and is connected to a second power source. The power conversion system further includes a first current calculation unit for detecting a first distortion component of a current flowing from a first power source for calculating an AC input current reference of the second converter such as to eliminate the first distortion component, a converter control unit for controlling the second converter based on the AC input current reference, a second current calculation unit for detecting a second distortion component of a current flowing into a second power source for calculating an AC output current reference of the second inverter such as to eliminate the second distortion component, and an inverter control unit for controlling the second inverter based on the AC output current reference. Exchanging power in both directions between the first and second power sources is thereby capable.

According to this invention, the data of all the actual value current vector data are supplied, and the actual value current vector data which is closest to the instruction value vector is selected. The conduction condition of the self-turn-off switching devices that constitute the unit converters is then controlled in accordance with the selected actual value vector data. In this way, the AC output current of the power conversion system becomes a sinewave current that tracks the instruction value vector.

With this invention constituted as described above, as shown for example in FIGS. 7A–F, in the period from time point t1 to time point t8, the absolute value of three-phase AC current instruction value RIV is larger than the absolute value of the other two phases RIW and RIU, and RIV is negative, so in this period, all the switching devices of the Y phase arm which is connected to the V phase of the unit converter shown in FIG. 3 i.e. GTO 13, 19, 25 and 31 are supplied with an ON signal. In this condition, when for example at time point t1 an ON signal is applied to the switching devices of the V phase arm of unit converter 5 i.e. to GTO 10, the current that is supplied from DC power source 41 is bypassed through GTOs 10 and 13 without flowing to load 1. When, at time point t2, GTO 10 is turned OFF and GTO 9 is turned ON, the current that is supplied from DC power source 41 flows to load 1. In this way, the U phase current of the power conversion system is gradually increased by turning on GTO 15 at time point t4 and turning on GTO 21 at time point t6, resulting in current IU of FIGS. 7A–F. That is, by controlling current IU so as to track U phase current reference RIU, IU can be controlled to a sinewave current.

With this invention of the above construction, a sufficiently large power can be supplied, thanks to the combination of an externally commutated power converter and a self-commutated power converter.

Furthermore, surge voltage generated by the self-commutated power converter is absorbed by the capacitor connected to the output terminal of its inverter. Also, distortion components generated in the output of the second inverter of the second power converter are detected by a current calculating circuit, which calculates the inverter output current such that generation of such distortion is suppressed.

The inverter control circuit controls the second inverter of the second power converter in accordance with the result of this calculation. Consequently, an inexpensive construction can be achieved, yet power of small fluctuation, even for a leading-phase or lagging-phase load, can be supplied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A–G is a waveform diagram showing the operation of the embodiment shown in FIG. 8;

FIGS. 16A–G is a waveform diagram showing the operation of the prior art power conversion system shown in FIG. 15.

DETAILED DESCRIPTION OF THE PREFERRED EMBODIMENTS

Figure 1:
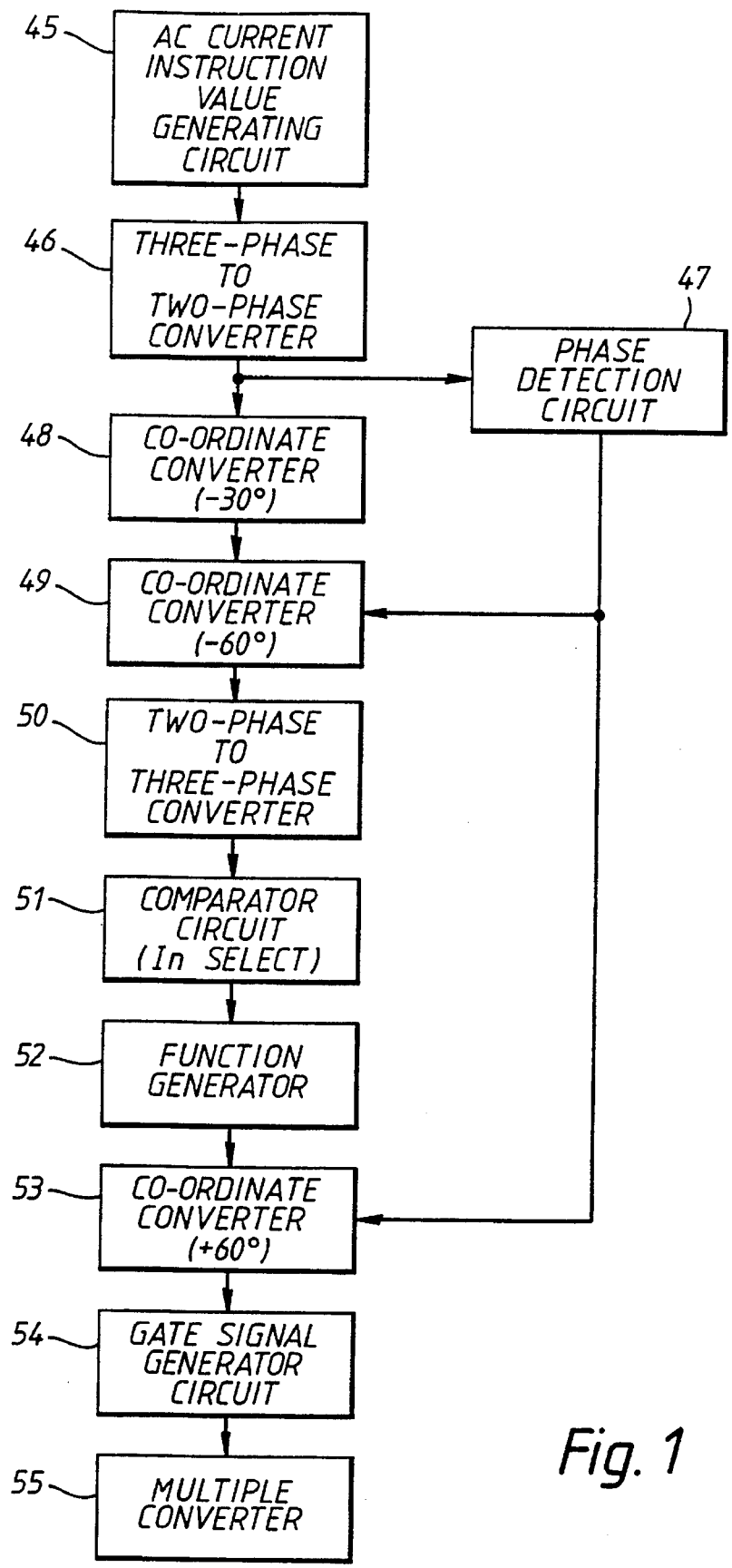
FIG. 1 is a layout diagram showing a control device for a power conversion system according to an embodiment of this invention.

Referring now to the drawings, wherein like reference numerals designate identical or corresponding parts throughout the several views, the embodiments of this invention will be described below.

Figure 3:
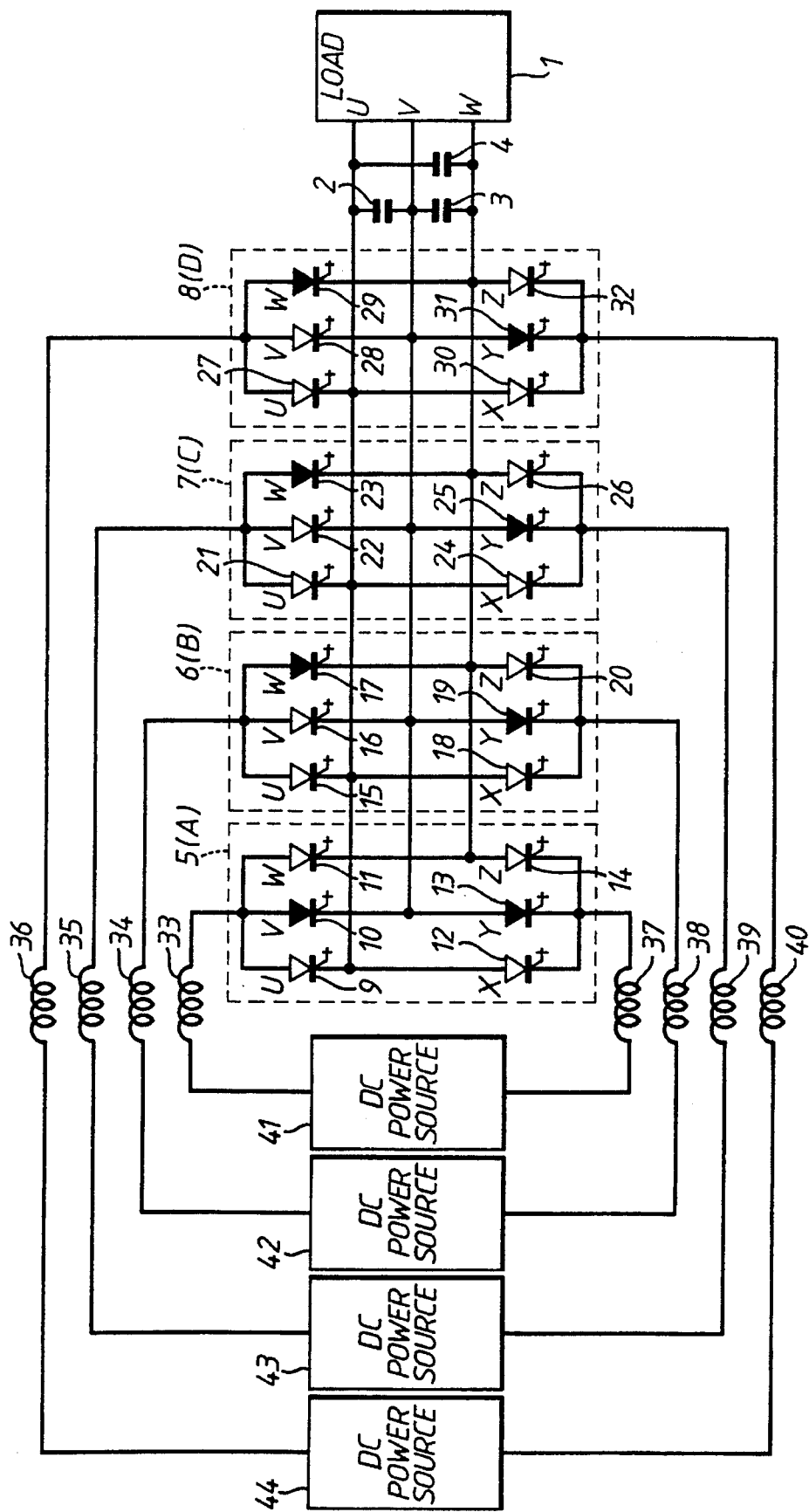
FIG. 3 is a layout diagram of the main circuit of a power conversion system used in the prior art and in this invention.
Figure 4:
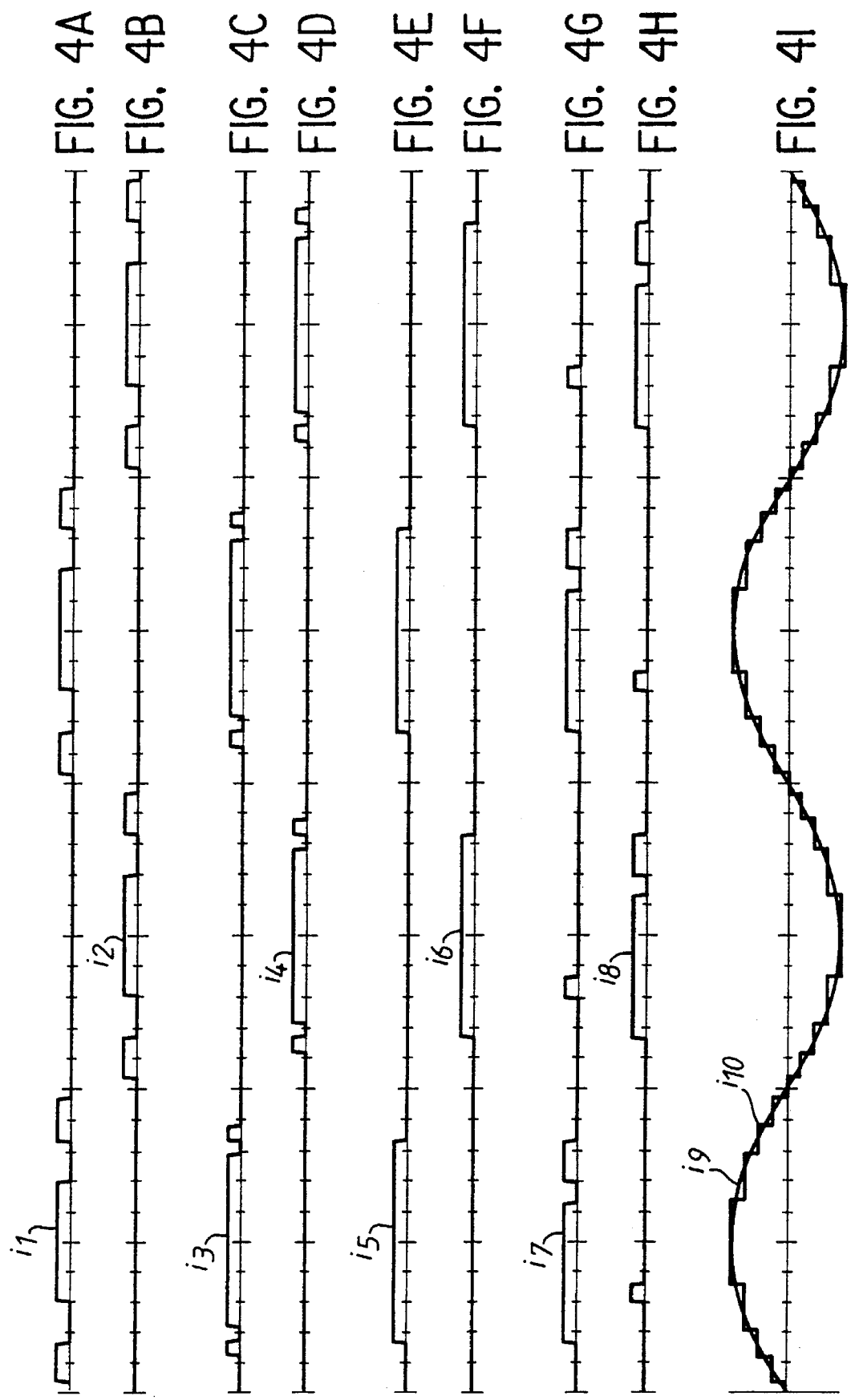
FIGS. 4A–I is a waveform diagram showing the operation of the embodiment shown in FIG. 1.

FIG. 3 is a layout diagram of the main circuit used in this invention. In this Figure, 1 to 44 are the same as already explained in the description of the prior art, and a description thereof is therefore omitted. The DC currents flowing in converter 5 to converter 8 are controlled to be respectively equal.

Figure 2:
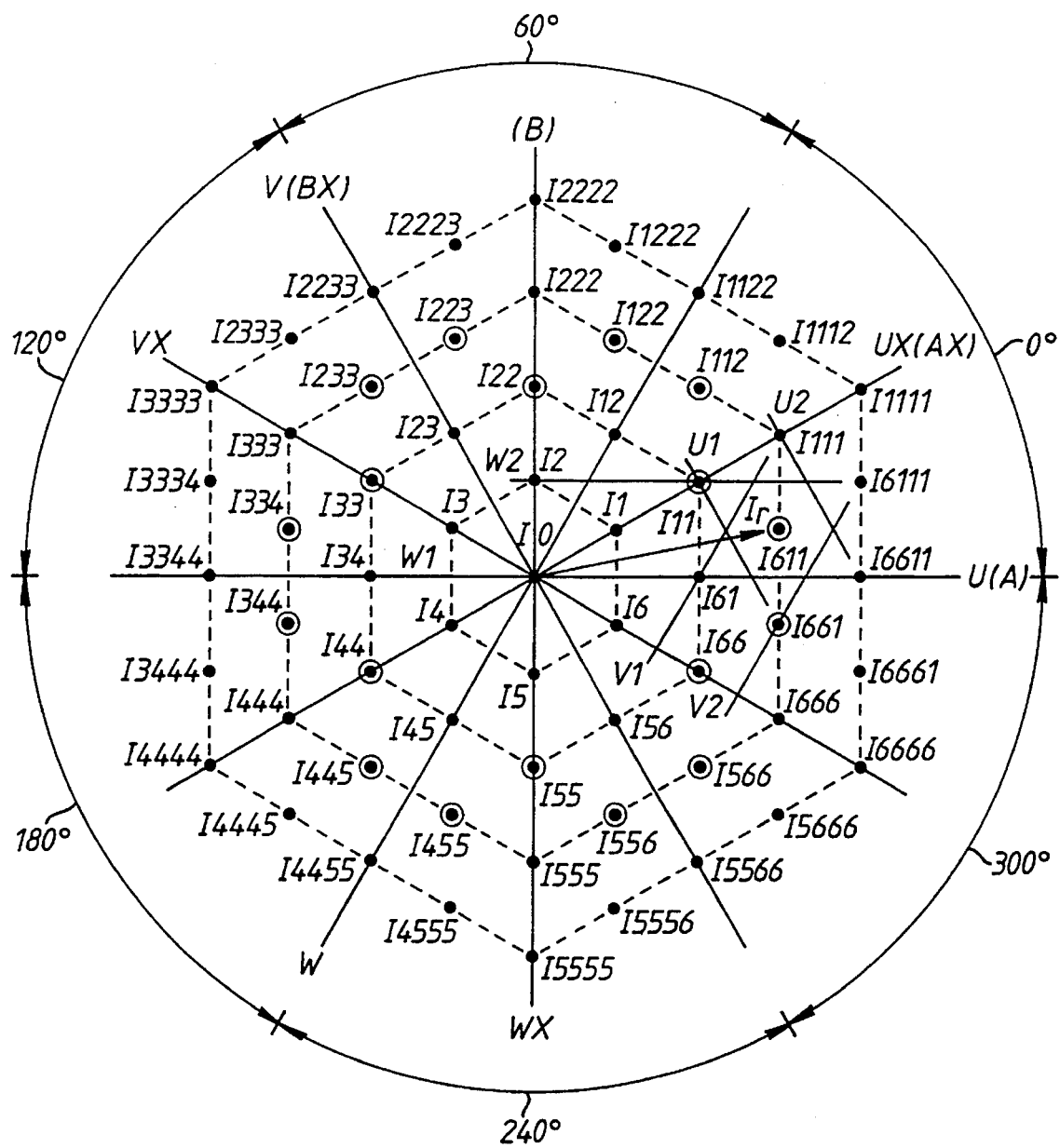
FIG. 2 is a view of the current vectors generated on the AC side by the power conversion system.

FIG. 2 is a view of the current vectors generated on the AC side by the quadruple power conversion system shown in FIG. 3. FIG. 2 is also given in explanation of the operation of this invention. The co-ordinate axes are indicated by U, V and W.

Seven current vectors generated by a unit converter will be described.

The output current when GTO 9 and GTO 12 of converter 5 are conducting and current flows from the U phase to the X phase, is zero: let this current be represented by I0.

The current when GTO 9 and GTO 14 are conducting and current flows from the U phase to the Z phase is represented by a current vector I1.

The current when GTO 10 and GTO 14 are conducting and current flows from the V phase to the Z phase is represented by a current vector I2.

The current when GTO 10 and GTO 12 are conducting and current flows from the V phase to the X phase is represented by a current vector I3.

The current when GTO 11 and GTO 12 are conducting and current flows from the W phase to the X phase is represented by a current vector I4.

The current when GTO 11 and GTO 13 are conducting and current flows from the W phase to the Y phase is represented by a current vector I5.

The current when GTO 9 and GTO 13 are conducting and current flows from the U phase to the Y phase is represented by a current vector I6.

As described above, seven current vectors I0, I1, I2, I3, I4, I5 and I6 are generated by a unit converter. FIG. 2 shows all the current vectors that can be generated by the quadruple power conversion system shown in FIG. 3. current vectors can be generated by combination of the current vectors of the four unit converters 5, 6, 7 and 8. For example, a vector I111 represents a condition in which three of the converters generate current vectors I1, while one converter generates current vector I0. Vector I1112 shows the condition when three converters are generating current vector I1 and one converter is generating current vector I2. Vector I6611 shows the condition where two converters are generating current vector I6 and two converters are generating current vector I1. This convention will be applied to other current vectors, so that the detailed description thereof may be omitted.

The essence of this invention consists in that, when an instruction value vector for AC output current of the power conversion system is given, the GTO conduction condition is controlled such that the power conversion system generates the current vector that is closest to the instruction value vector. It is therefore necessary to detect the regions that are closest to the respective vectors in respect of all the current vectors that the power conversion system is capable of generating. For example, considering vector I611 and the six vectors I61, I661, I6611, I6111, I111, and I11 that surround vector I611, the interior of the regular hexagon that is formed by the locus of the points of equal distance to I611 and I61, the locus of the points of equal distance to I611 and I661, the locus of the points of equal distance to I611 and I6611, the locus of the points of equal distance to I611 and I6111, the locus of the points of equal distance to I611 and I111, and the locus of the points of equal distance to I611 and I11 is the region closest to vector I611.

Next, co-ordinate axes UX, VX and WX are taken which are 30° advanced with respect to co-ordinate axes U, V, and W, respectively. In these co-ordinate axes UX, VX and WX, it can be seen that the region closest to vector I611 is within the range of U1 and U2 of the UX co-ordinate, within the range of V1 and V2 of the VX co-ordinate, and within the range of W1 and W2 of the WX co-ordinate. Consequently, it is considered that Ir is given as an instruction value vector of the AC output current of the power conversion system, and instruction value vector Ir is converted to a vector in UX, VX, and WX co-ordinates. When the UX co-ordinate of instruction value vector Ir is within the range of U1 and U2, the VX co-ordinate thereof is within the range of V1 and V2, and the WX co-ordinate thereof is within the range of W1 and W2, an actual-value current vector In that can be generated by the power conversion system that is closest to instruction value vector Ir is therefore current vector I611.

In this way, actual-value current vector In of the power conversion system which is closest to instruction value vector Ir can be selected by means of the UX, VX and WX components of instruction value vector Ir.

In this invention, the power conversion system is controlled as described below. If it is assumed that, for example, instruction value vector Ir shown in FIG. 2 is given and that this instruction value vector Ir does not change, at a certain time point, actual value current vector I611 of the power conversion system is selected. In order that the power conversion system generates current vector I611, one converter is controlled to generate current vector I6, two converters are controlled to generate current vectors I1, and one converter is controlled to generate current vector I0 (or three converters are controlled to generate current vectors I1 and one converter is controlled to generate current vector I5).

Thus, when this instruction value vector Ir rotates with a prescribed angular frequency, the actual-value current vectors of the power conversion system are controlled so that they become, in turn, I111→I112→I122→I22→I223→ I233→I33→ to I661→I611.

FIG. 1 is a control circuit layout diagram of an embodiment of this invention in which the current vectors of the converters are controlled in accordance with the principles described above. In this Figure, 45 is an AC current instruction value generating circuit, which generates, as an AC output current instruction value vector of the power conversion system, components R1U1, R1V1, R1W1 on the U, V and W co-ordinates. 46 is a three-phase to two-phase converter constituted by an adder and a multiplier (not shown).

$$RIA1 = RIU1 - (RIV1 + RIW1)/2$$

$$RIB1 = (RIV1 - RIW1) \cdot 1.732/2$$

By the above calculation, three-phase to two-phase converter 46 converts components RIU1, RIV1, RIW1 on the U, V and W co-ordinates to components RIA1, RIB1 on the A, B co-ordinates. The A axis is an axis parallel to the U axis and the B axis is an axis that is advanced by 90° with respect to the A axis.

47 is a phase detection circuit constituted by a sine function generator (not shown), and detects a phase angle of instruction value vector Ir by a calculation $\tan^{-1}$ (RIB1/RIA1). Phase detection circuit 47 generates a signal TH6 as in the following, based on the phase angle of instruction value vector Ir in FIG. 2.

TH6=0°, when Ir is in the range of the U axis and the −W axis.

TH6=60°, when Ir is in the range of the −W axis and the V axis.

TH6=120°, when Ir is in the range of the V axis and −U axis.

TH6=180°, when Ir is in the range of the −U axis and the W axis.

TH6=240°, when Ir is in the range of the W axis and the −V axis.

TH6=300°, when Ir is in the range of the −V axis and the U axis.

48 is a co-ordinate converter constituted by a sine function generator (not shown).

$$RIA2 = RIA1 \cdot \cos(-30°) - RIB1 \cdot \sin(-30°)$$

$$RIB2 = RIB1 \cdot \cos(-30°) - RIA1 \cdot \sin(-30°)$$

By the above calculation, co-ordinate converter 48 converts components RIA1, RIB1 on the A, B co-ordinates to components RIA2, RIB2 on the AX and BX co-ordinates, which are 30° advanced therefrom from the A and B co-ordinates, respectively.

49 is a co-ordinate converter constituted by a since function generator (not shown).

By a calculation:

$$RIA3=RIA2\cdot\cos(-TH6)-RIB2\cdot\sin(-TH6)$$

$$RIB3=RIB2\cdot\cos(-TH6)-RIA2\cdot\sin(-TH6)$$

it converts components RIA2, RIB2 on the AX and BX co-ordinates to components RIA3, RIB3 on the co-ordinates, which are rotated in stepwise manner by 60° in each case with reference to the AX and BX co-ordinates, respectively, by co-ordinate transformation with output signal TH6 of phase detection circuit 47.

50 is a two-phase to three-phase converter constituted by an adder and a multiplier (not shown).

By a calculation:

$$RIU3=RIA3/1.5$$

$$RIV3=(-0.5\cdot RIA3+0.866\cdot RIB3)/1.5$$

$$RIW3=(-0.5\cdot RIA3-0.866\cdot RIB3)/1.5$$

it converts components RIA3, RIB3 on the co-ordinates rotated in stepwise manner by 60° in each case with reference to the AX and BX co-ordinates into components RIU3, RIV3 and RIW3 on the co-ordinates rotated in stepwise manner by 60° in each case with reference to the UX, VX and WX co-ordinates, respectively.

51 is a comparator that contains data of actual-value current vector In of the power conversion system on the UX, VX and WX co-ordinates. As an example, the data of actual-value current vector In of the power conversion system are constituted by 13 data items: I0, I1, I61, I11, I12, I611, I111, I112, I6611, I6111, I1111, I1112, and I1122.

Comparator circuit 51 is supplied with current vector instruction values RIU3, RIV3 and RIW3 of the power conversion system from two-phase to three-phase converter 50. For example, when RIU3 is in the range of U1 and U2, RIV3 is in the range of V1 and V2, and RIW3 is in the range of W1 and W2 in FIG. 2, current vector I611 is selected as actual-value current vector In of the power conversion system which is closest to instruction value vector Ir. In this way, 13 vectors can be selected as actual-value current vector In of the power conversion system closest to instruction value vector Ir. When instruction value vector Ir rotates and gets within the range of the −W axis and the V axis of FIG. 2, signal TH6 of phase detection circuit 47 changes from 0° to 60°. Consequently, as instruction value vector Ir of the power conversion system is rotated by −60° by co-ordinate converter 49, actual-value current vector In can be continually detected by the 13 data items: I0, I1, I61, I11, I12, I611, I111, I112, I6611, I6111, I1111, I1112, and I1122.

Specifically, vector I122 is a vector obtained by rotating vector I611 by 60°, vector I233 is a vector obtained by rotating vector I611 by 120°, vector I344 is a vector obtained by rotating vector I611 by 180°, vector I455 is a vector obtained by rotating vector I611 by 240°, and vector I566 is a vector obtained by rotating vector I611 by 300°. Vector I22 is obtained by rotating vector I11 by 60°, and vector I66 is obtained by rotating vector I11 by 300°. Vector I223 is obtained by rotating vector I112 by 60°, while vector I661 is obtained by rotating vector I112 by 30° and so on. So, actual-value current vector In can be detected by the above 13 data over the entire range of 360°.

52 is a function generator that generates a GTO switching pattern corresponding to actual-value current vector In. As an example, when current vector I611 is supplied as actual-value current vector In, in the power conversion system shown in FIG. 3, in converter 5, the U phase (GTO 9) and Y phase (GTO 13) are turned on; in converter 6 the U phase (GTO 15) and Z phase (GTO 20) are turned on; in converter 7 the U phase (GTO 21) and Z phase (GTO 26) are turned on; and in converter 8 the U phase (GTO 27) and X phase (GTO 13) are turned on. If this is done, converter 5 generates current vector I6, converter 6 generates current vector I1, converter 7 generates current vector I1, and converter 8 generates current vector I0. Adding these current vectors up, current vector I611 of the power conversion system is obtained.

Alternatively, in converter 5 the U phase (GTO 9) and Z phase (GTO 14) are turned on; in converter 6 the U phase (GTO 15) and Z phase (GTO 20) are turned on; in converter 7 the U phase (GTO 21) and Z phase (GTO 26) are turned on; and in converter 8 the W phase (GTO 29) and Y phase (GTO 31) are turned on. If this is done, converter 5, converter 6 and converter 7 generate current vectors I1, while converter 8 generates current vector I5. Adding these current vectors up likewise results in current vector I611 of the power conversion system.

53 is a co-ordinate converter. Rotation of the current vector of the GTO in the ON condition in 60° steps in the positive direction by signal TH6 of phase detector circuit 47 causes the co-ordinates of the current instruction value vector which were rotated in the negative direction with 60° steps by co-ordinate converter 49 to be returned to the original co-ordinates.

54 is a gate signal generator circuit that generates GTO firing pulses for multiple converter 55 constituted by converter 5 to converter 8 of FIG. 3, based on the output of co-ordinate converter 53.

As described above, control of the power conversion system is exercised such that, when instruction value vector Ir as shown in FIG. 2 is supplied, current vector I611 is selected; with rotation of instruction value vector current vector I11 is next selected, then, further, current vector I112 is selected, thereby generating the respective current vectors.

When instruction value vector Ir enters the 60° range from the 0° range, the instruction value vector Ir of the converter current is rotated by −60° by co-ordinate converter 49 and current vector I611 is again selected. However, in fact, the power conversion system is controlled such that current vector I122, which is rotated by 60° by co-ordinate converter 53, is generated. Next, rotation of instruction value vector Ir would cause selection of current vector I11, but in fact, the power conversion system is controlled such that current vector I22, which is rotated by 60° from current vector I11, is generated.

Further rotation of instruction value vector Ir would next cause selection of current vector I112. However, in fact, the power conversion system is controlled such that current vector I223 is generated, which is rotated by 60° from current vector I112.

when instruction value vector Ir further rotates, entering the 60° range from the 0° range, instruction value vector Ir of the converter current is again rotated by −60° by the co-ordinate converter 49, so that current vector I611 is again selected. However, in fact, the power conversion system is controlled such that current vector I233, which is rotated by 120° by co-ordinate converter 53, is generated.

Thus, current vectors I611, I11 and I112 are selected in the range of 0°. But, in fact, control is exercised such that current vectors are generated in the sequence: I11→I112→ I122→I22→I223→I233→I33→I334→I344→I44→I445→ →I455→I55→I556→I566→I66→I661→I611.

FIGS. 4A–I is a waveform diagram illustrating the operation of an embodiment of this invention when the power conversion system is operated as described above with reference to FIG. 1 and FIG. 2. In this Figure, i1 is a current flowing in U-phase GTO 9 of converter 5. i2 is a current flowing in X-phase GTO 12 of converter 5. i3 is a current flowing in U-phase GTO 15 of converter 6. i4 is a current flowing in X-phase GTO 18 of converter 6. i5 is a current flowing in U-phase GTO 21 of converter 7. i6 is a current flowing in X-phase GTO 24 of converter 7. i7 is a current flowing in U-phase GTO 27 of converter 8. i8 is a current flowing in X-phase GTO 30 of converter 8. i10 is a U-phase current obtained by adding up currents i1 to i8 above. It can be seen that as U-phase current i10 a sine wave form closely tracks instruction value i9 can be obtained.

The essence of this invention lies in controlling the conduction condition of the GTOs such that, when an instruction value vector of the AC output current of the power conversion system is given, the power conversion system generates the current vector that is closest to the instruction value vector. However, as the method of selecting the actual-value current vector In that is generated by the power conversion system, methods other than that described with reference to FIG. 1 are also possible.

Figure 5:
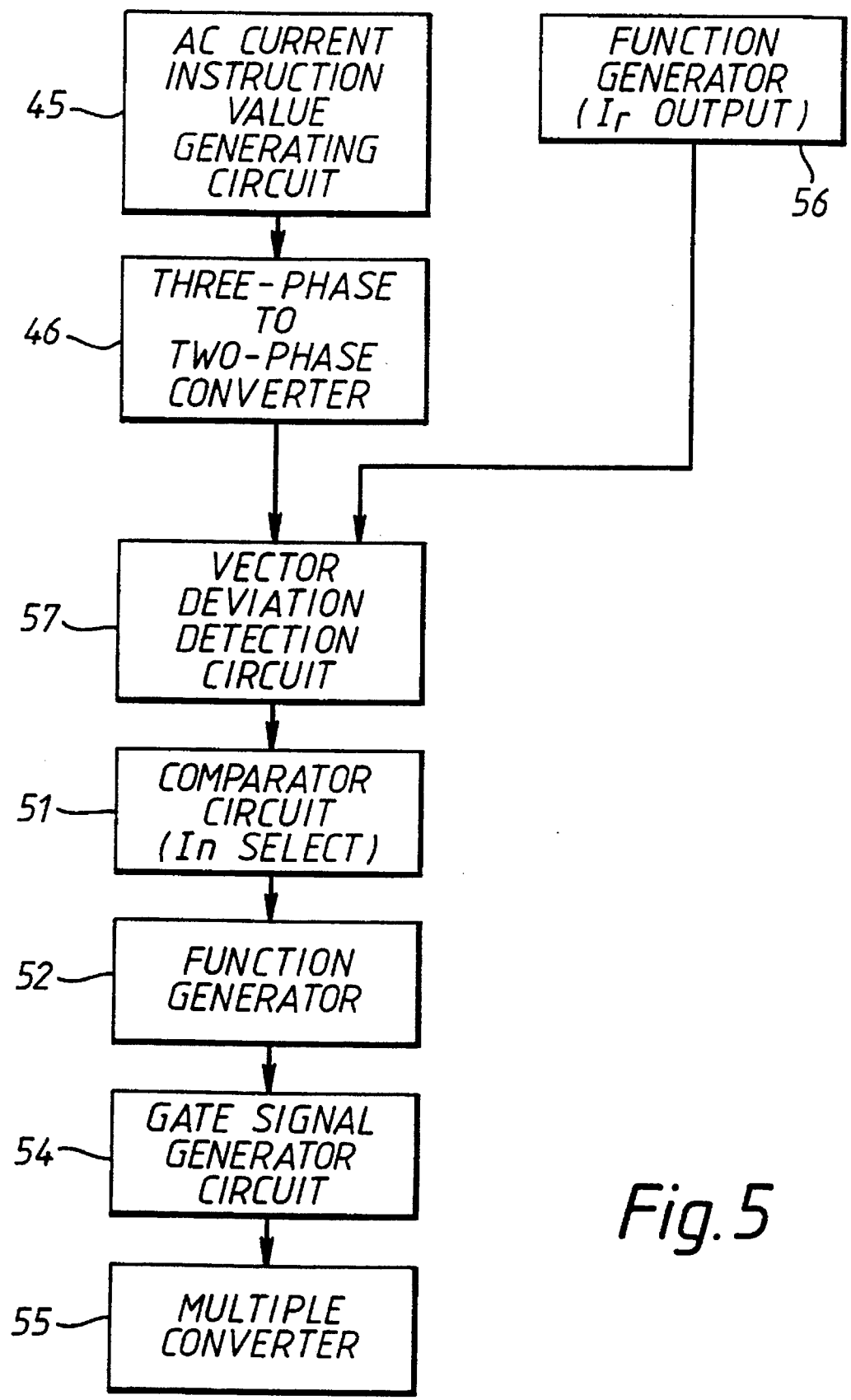
FIG. 5 is a layout diagram showing a control device for a power conversion system according to another embodiment of this invention.

FIG. 5 is a layout diagram of another embodiment of a control circuit according to this invention. In this Figure, AC current instruction value generating circuit 45, three-phase to two-phase converter 46, function generator 52, gate signal generating circuit 54, and multiple converter 55 are the same as in FIG. 1. 56 is a function generator, which generates the data of A axis components InA and B axis components InB of actual-value current vectors In (61 possible vectors in FIG. 2) that can be generated by the power conversion system. As already described with reference to FIG. 1, three-phase to two-phase converter 46 generates components RIA1 and RIB1 of instruction value vector Ir of the AC output current on the A and B co-ordinates. 57 is a vector deviation detection circuit, that detects a deviation IDN between instruction value vector Ir and actual-value current vector In by the following calculation.

$$IND=[(RIA1-InA)^2+(RIB1-InB)^2]^{1/2}$$

Next, the deviation IDN between instruction value vector Ir and all of the actual-value current vectors In that can be generated by the power conversion system are compared, and the actual-value current vector In which has the smallest deviation IDN with respect to instruction value vector Ir is selected. The subsequent operation of the function generator 52 and gate signal generating circuit 54 is the same as in FIG. 1.

The detection and calculation processes performed by each of these units or circuits shown in FIG. 1 and FIG. 5 are executed by a microprocessor.

In the above explanation, a case was described, as one example, that this invention is applied to a power conversion system in which four converters were connected in parallel. However, this invention can also be applied to a power conversion system in the same way in which a plurality of converters of number other than four are connected in parallel.

As described above, according to an embodiment of this invention, the AC output current of a power conversion system comprising a multiple converter wherein DC terminals are connected to respective DC power sources individually through reactors and AC terminals are connected respectively in common, being connected to a common AC load, can be controlled to a sine wave form. As a result, in particular, it is possible to reduce higher harmonics when performing high-capacity power conversion with a large number of converters connected in parallel.

Still another embodiment of this invention is described below with reference to the drawing.

Figure 6:
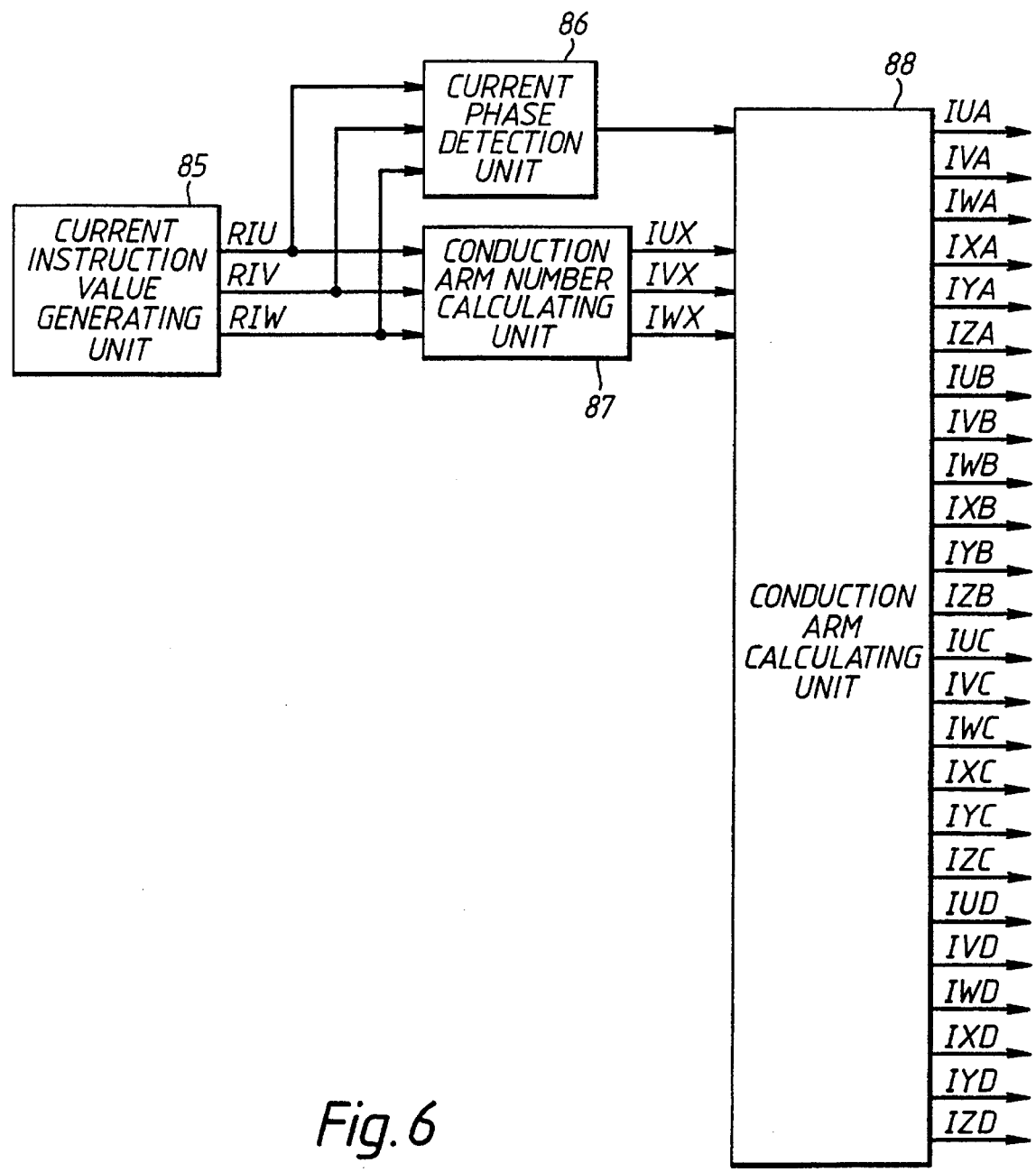
FIG. 6 is a layout diagram showing a control device for a power conversion system according to still another embodiment of this invention.
Figure 7A:
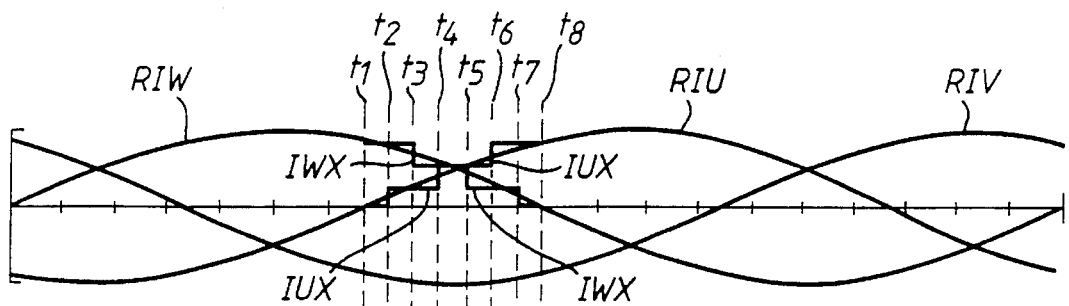
FIGS. 7A–F is a waveform diagram showing the operation of the embodiment shown in FIG. 6.
Figure 7B:
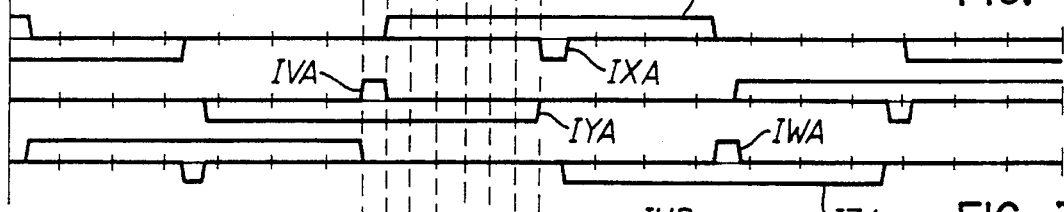
Figure 7C:
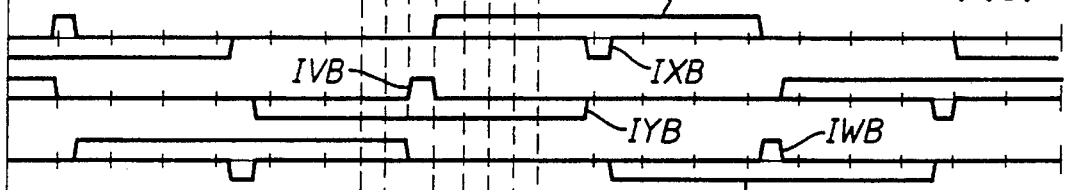
Figure 7D:
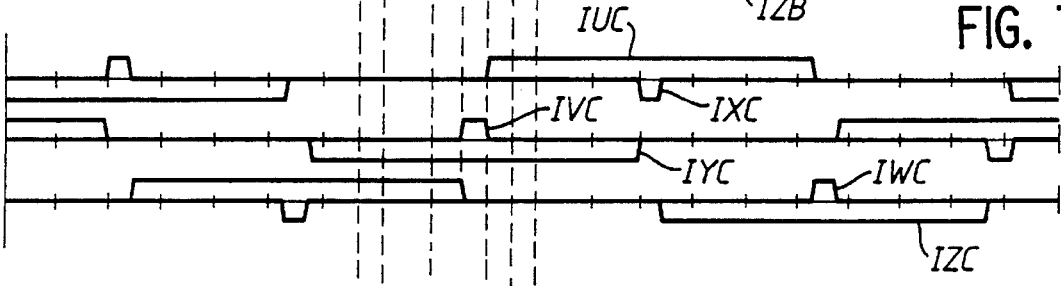
Figure 7E:
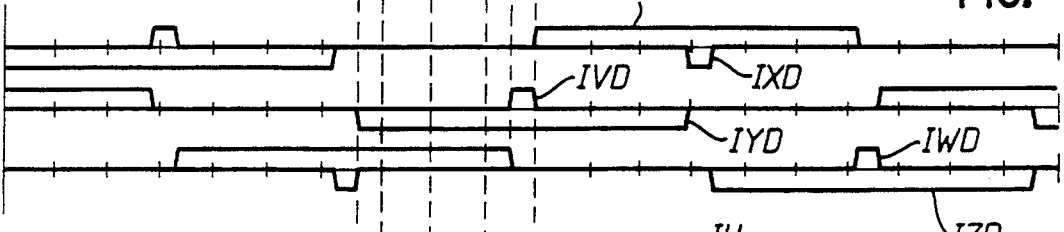
Figure 7F:
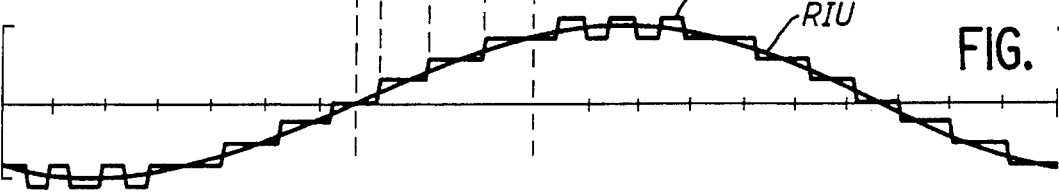

FIG. 6 is a layout diagram of a control device of a power conversion system according to an embodiment of this invention whereby the output current of the power conversion system shown in FIG. 3 is controlled to a sine waveform.

In FIG. 6, 85 is a current instruction value generating unit, 86 is a current phase detection unit, 87 is a conduction arm number calculating unit, and 88 is a conduction arm calculating unit. The detection and calculation processes performed by each of these units are executed by a microcomputer.

FIGS. 7A–F is a waveform diagram given in explanation of the operation of the embodiment of this invention described with reference to FIG. 3 and FIG. 6.

The operation of the embodiment of this invention is described below with reference to FIG. 3, FIG. 6 and FIGS. 7A–F. In order to facilitate understanding of the explanation, converter 5 shown in FIG. 3 will be called converter A, converter 6 will be called converter B, converter 7 will be called converter C, and converter 8 will be called converter D. Furthermore, the symbols of the positive arms of each converter will be specified as U, V, W, and the symbols of the negative arms will be specified as X, Y, Z.

In these Figures, RIU, RIV, and RIW are outputs of the current instruction value generating unit 85. RIU is a U phase current instruction value, RIV is a V phase current instruction value and RIW is a W phase current instruction value. IUX, IVX, and IWX are outputs of the conduction arm number calculating unit 87, and show the numbers of conduction arms of U, V and W phases, respectively. IUX, IVX and IWX are instruction values of the conduction numbers corresponding to current instruction values RIU, RIV and RIW, respectively. IUA to IZD are outputs of conduction arm calculating unit 88: IUA, IVA, IWA, IXA, IYA, and IZA are conduction instructions of U, V, W, X, Y and Z phase arms of converter A, respectively; IUB, IVB, IWB, IXB, IYB and IZB are conduction instructions of U, V, W, X, Y and Z phase arms of converter B, respectively; IUC, IVC, IWC, IXC, IYC and IZC are conduction instructions of U, V, W, X, Y and Z phase arms of converter C, respectively; and IUD, IVD, IWD, IXD, IYD and IZD are conduction instructions of U, V, W, X, Y, and Z phase arms of converter D. Here, it is assumed that the DC currents of converter A, converter B, converter C and converter D ape controlled to respectively equal DC current values IDC by means of DC power source 41, DC power source 42, DC power source 43 and DC power source 44. U phase conduction number instruction value IUX is found by the following calculation performed by conduction arm number calculating unit 87.

When RIU/IDC<−3.5, IUX=−4

When −3.5≦RIU/IDC<−2.5, IUX=−3

When −2.5≦RIU/IDC<−1.5, IUX=−2

When −1.5≦RIU/IDC<−0.5, IUX=−1

When −0.5≦RIU/IDC<0.5, IUX=0

When 0.5≦RIU/IDC<1.5, IUX=1

When 1.5≦RIU/IDC<2.5, IUX=2

When 2.5≦RIU/IDC<3.5, IUX=3

When 3.5≦RIU/IDC, IUX=4

Conduction number instruction value IVX of the V phase and conduction number instruction value IWX of the W phase are found in the same way as in the U phase described above.

Control of the phase at which the current is a maximum, control of the AC current, and control of the bypass current will now be explained in order.

(1) Control of the phase at which the current is a maximum

Current phase detection unit 86 detects the current phase every 60° at which the absolute value of RIU, the absolute value of RIV or the absolute value of RIW becomes a maximum. For example, in the period from time point t1 to time point t8 in FIGS. 7A–F, the absolute value of V phase current instruction value RIV is a maximum and V phase current instruction value RIV is negative.

Conduction arm calculating unit 48 generates a conduction instruction as follows in accordance with the output signal of current phase detection unit 86, including a maximum phase at which the current is a maximum and a polarity of the current instruction value of the maximum phase.

(1–a) |RIV|: max., RIV<0

Signals IYA, IYB, IYC and IYD become 1, causing arm Y of converter A, arm Y of converter B, arm Y of converter C and arm Y of converter D to conduct.

In the same way for the other periods at 60° intervals continuing the period from time point t1 to time point t8 shown in FIGS. 7A–F, conduction arm calculating unit 48 generates conduction instructions as follows.

(1–b) |RIU|: max., RIV>0

Signals IUA, IUB, IUC, and IUD become 1, allowing arm U of converter A, arm U of converter B, arm U of converter C, and arm U of converter D to conduct.

(1–C) |RIW|: max., RIW<0

Signals IZA, IZB, IZC, and IZD become 1, allowing arm Z of converter A, arm Z of converter B, arm Z of converter C, and arm Z of converter D to conduct.

(1–d) |RIV|: max., RIV>0

Signals IVA, IVB, IVC and IVD become 1, allowing arm V of converter A, arm V of converter B, arm V of converter C and arm V of converter D to conduct.

(1–e) |RIU|: max., RIU<0

Signals IXA, IXB, IXC and IXD become 1, allowing arm X of converter A, arm X of converter B, arm X of converter C and arm X of converter D to conduct.

(1–f) |RIW|: max., RIW>0

Signals IWA, IWB, IWC, IWD become 1, allowing arm W of converter A, arm W of converter B, arm W of converter C and arm W of converter D to conduct.

(2) Control of the AC current

Conduction arm calculating unit 88 generates the conduction instruction with respect to AC current according to output signals of phase detection unit 86 and conduction arm number calculating unit 87.

During the period from time point t1 to time point t8 shown in FIGS. 7A–F, for example AC current is controlled as follows.

When IUX≧1, signal IUA allows arm U of converter A to conduct.

When IUX≧2, signal IUB allows arm U of converter B to conduct.

When IUX≧3, signal IUC allows arm U of converter C to conduct.

When IUX≧4, signal IUD allows arm U of converter D to conduct.

When IWX≧1, signal IWD allows arm W of converter D to conduct.

When IWX≧2, signal IWG allows arm W of converter C to conduct.

When IWX≧3, signal IWB allows arm W of converter B to conduct.

When IWX≧4, signal IWA allows arm W of converter A to conduct.

In the example shown in FIGS. 7A–F,

At time point t2, IUX becomes 1 and IUA becomes 1.

At time point t4, IUX becomes 2 and IUB becomes 1.

At time point t6, IUX becomes 3 and IUC becomes 1.

At time point t3, IWX becomes 2 and IWB becomes 0.

At time point t5, IWX becomes 1 and IWC becomes 0.

At time point t7, IWX becomes 0 and IWD becomes 0.

The same control is exercised in the other periods at 60° intervals continuing the period from time point t1 to time point t8 as described above.

(3) Control of bypass current

Conduction arm calculating unit 88 Generates the conduction instruction with respect to bypass current according to output signals of phase detection unit 86 and conduction arm calculating unit 87.

During the period from time point t1 to time point t8, shown in FIGS. 7A–F, for example, bypass current is controlled as follows.

Signal IVA, which is found by: IVA=1—IUA—IWA, allows arm V of converter A to conduct.

Signal IVB, which is found by: IVB=1—IUB—IWB, allows arm V of converter B to conduct.

Signal IVC, which is found by: IVC=1—IUC—IWC, allows arm V of converter C to conduct.

Signal IVD, which is found by: IVD=1—IUD—IWD, allows arm V of converter D to conduct.

In the example shown in FIGS. 7A–F, in the period from time point t1 to time point t2, IUA and IWA are 0, so IVA becomes 1.

In the period from time point t3 to time point t4, IUB and IWB are 0, so IVB becomes 1.

In the period from time point t5 to time point t6, IUC and IWC are 0, so IVC becomes 1.

In the period from time point t7 to time point t8, IUD and IWD are 0, so IVD becomes 1.

The same bypass current control is exercised in the other periods at 60° intervals continuing the period from time point t1 to time point t8 as described above.

By exercising the same three controls in respect of the other periods at 60° intervals continuing the period from time point t1 to time point t8, output signals IUA, IVA, IWA, IXA, IYA, IZA, IUB, IVB, IWB, IXB, IYB, IZB, IUC, IVC, IWC, IXC, IYC, IZC, IUD, IVD, IWD, IXD, IYD, and IZD of the conduction arm calculation unit 88 are actuated as shown in FIGS. 7A–F.

Signals IUA, IVA, IWA, IXA, IYA, and IZA control arms U, V, W, X, Y and Z of converter A, respectively.

Signals IUB, IVB, IWB, IXB, IYB, and IZB control arms U, V, W, X, Y, Z of converter B, respectively.

Signals IUC, IVC, IWC, IXC, IYC, and IZC control arms U, V, W, X, Y, Z of converter C, respectively.

Signals IUD, IVD, IWD, IXD, IYD, and IZD control arms U, V, W, X, Y, Z of converter D, respectively.

IU is a total value of the U phase currents of converter A, converter B, converter C and converter D obtained by the above control. It is found from FIGS. 7A–F that as U phase current IU, a sinewave shaped current is obtained that tracks U phase current instruction value RIU. V phase current IV and W phase current IW are controlled in the same way as U phase current IU.

It should be noted that although the embodiment described above is the case in which four unit converters are operated in parallel, this invention could be put into practice in the same way when a plural number of unit converters other than four are operated in parallel.

As described above, according to an embodiment of this invention, the output current of a power conversion system that consists of n unit converters arranged to provide three-phase AC output by connecting the DC positive side terminals and DC negative side terminals individually to DC power sources through respective DC reactors, and connecting the AC terminals in parallel can be controlled to a sinewave form. As a result, in particular, in cases where a large-capacity power conversion is performed by connecting a large number of converters in parallel, higher harmonics can be reduced to a very small amount. Also, as shown in FIGS. 7A–F, each waveform is controlled in a regular manner, with conduction instructions IUA, IXA, IVA, IWA, IZA, . . . IZD being switched on/off twice for an output frequency of 1 Hz. If therefore for example the output frequency is 50 Hz, the switching frequency of each arm of a unit converter is 100 Hz, so control of the output current to a sine waveform can be achieved with a low switching frequency. Switching losses can thereby be reduced, enabling a power conversion system of high efficiency to be implemented.

Figure 8:
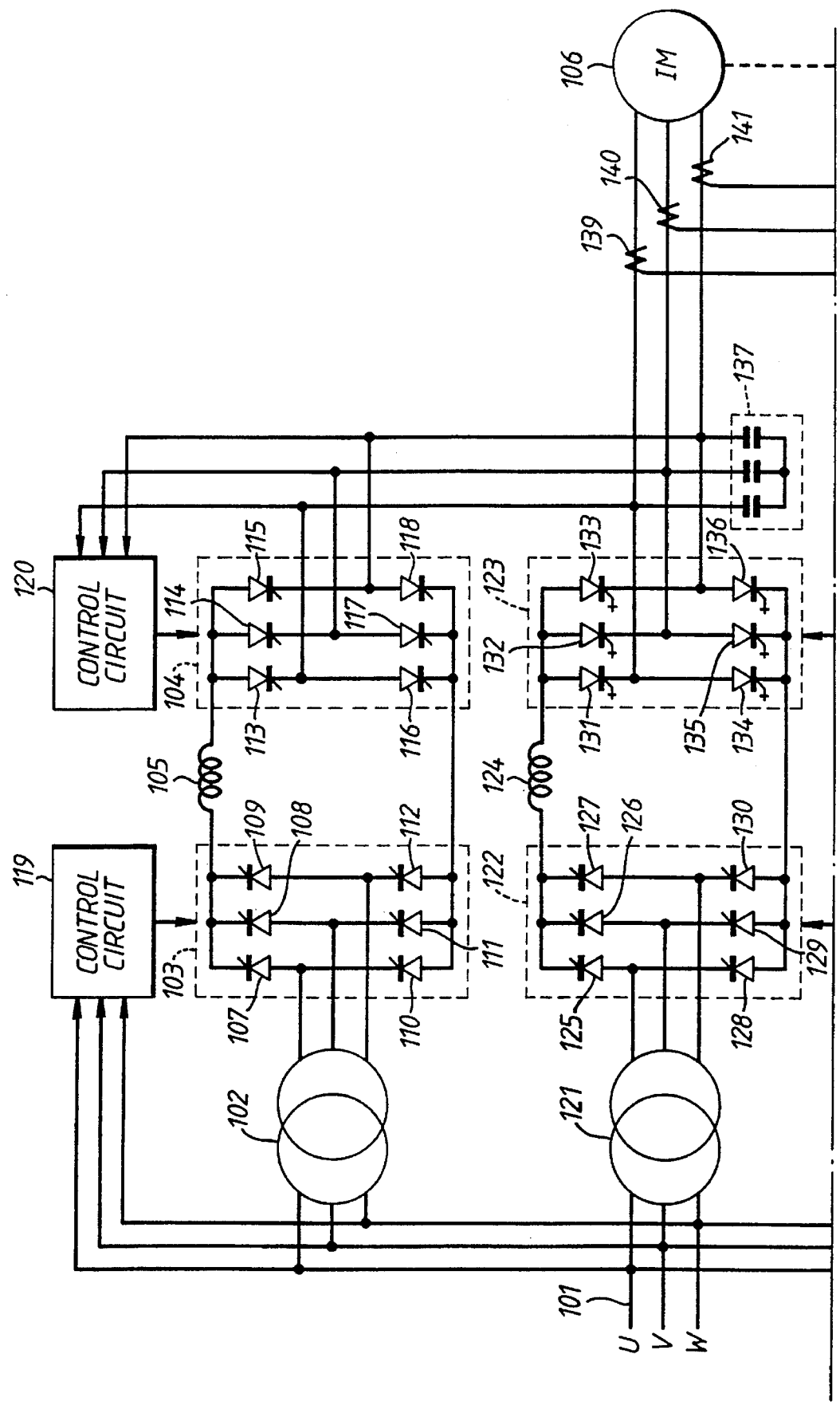
FIG. 8 is a layout diagram showing a power conversion system according to an embodiment of this invention.
Figure 8:
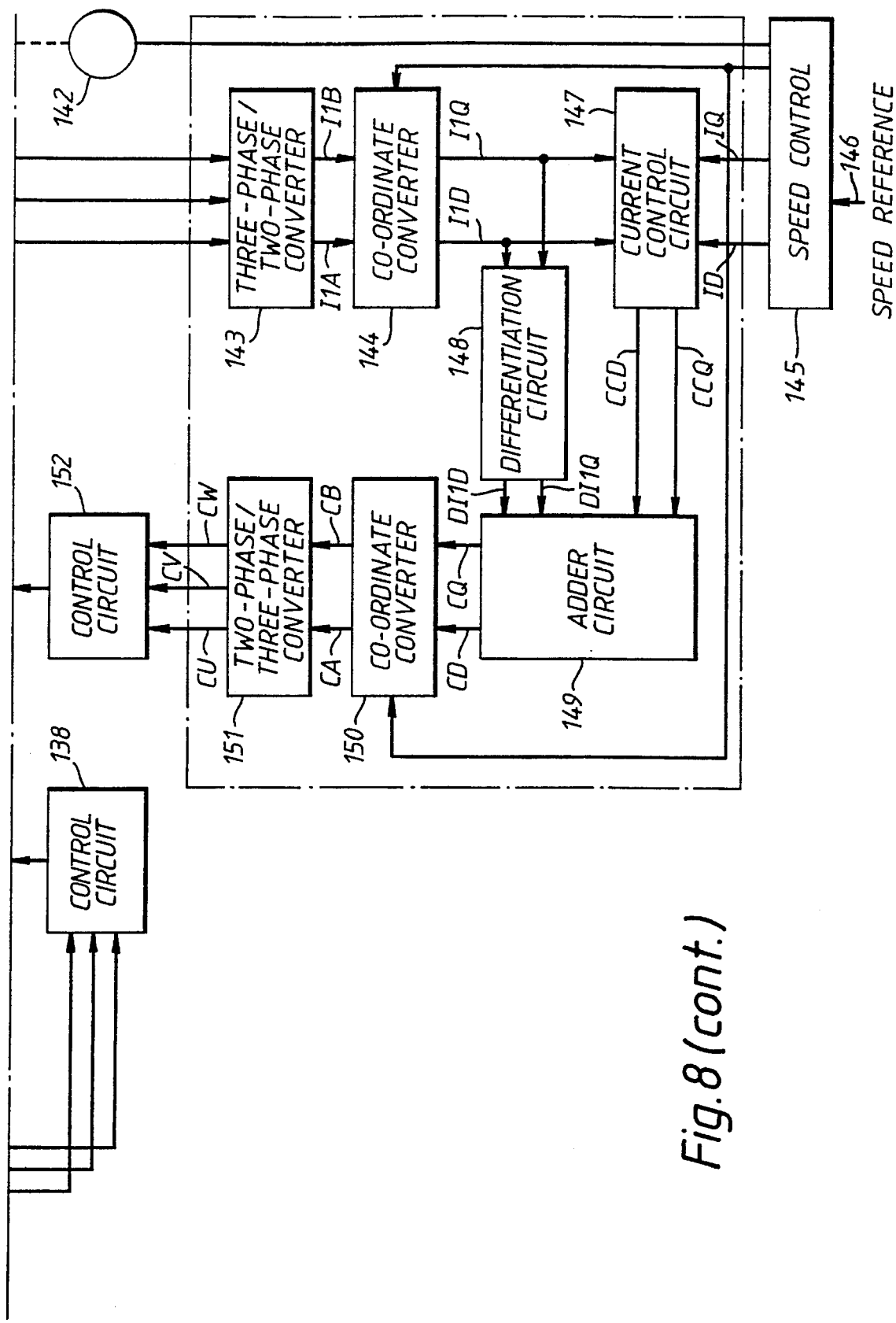

Other embodiments of this invention are described below with reference to FIG. 8 through FIG. 12. FIG. 8 is a layout diagram of a power conversion system according to an embodiment of this invention. In this Figure, 101 is power source, 102 is transformer, 103 is converter that converts AC power to DC power, 104 is inverter that converts DC power to AC power, 105 is DC reactor that smooths the DC current that flows to inverter 104 from converter 103, 106 is an induction motor, 107 to 112 are thyristors constituting converter 103, 113 to 118 are thyristors constituting inverter 104, 119 is control circuit of converter 103, and 120 is control circuit of inverter 104.

Also, 121 is a transformer, 122 is a converter that converts AC power to DC power, 123 is an inverter that converts DC power to AC power, 124 is a DC reactor that smooths the DC current flowing to inverter 123 from converter 122, 125 to 130 are the thyristors constituting converter 122, and 131 to 136 are the self-turn-off switching devices constituting inverter 123: in this case, it will be assumed that GTOs are employed. 137 is a capacitor for absorbing the surge voltage when GTOs 131 to 136 are turned off, and 138 is a control circuit of converter 122.

Inverter 123 has the function of converting to AC current the DC current smoothed by DC reactor 124 by commutation by the self-turn-off action of the GTOs 131–136. That is, a first power converter of the current source type is constituted by converter 103 and inverter 104, and a second power converter of the current source type is constituted by converter 122 and inverter 123.

139 to 141 are current detectors that detect the primary currents of induction motor 106, respectively. 142 is a rotation detector that detects the rotational speed of induction motor 106. 143 is a three-phase/two-phase converter. 144 is a co-ordinate converter. 145 is a speed control circuit that controls the rotational speed of induction motor 106. 146 is a speed reference for induction motor 106. 147 is a current control circuit that controls the primary currents of induction motor 106. 148 is a differentiation circuit. 149 is an adder circuit. 150 is a co-ordinate converter. 151 is a two-phase/three-phase converter. 152 is a control circuit of invention 123.

Of the above converters and circuits, those designated by reference numerals 143, 144, 147, 148, 149, 150 and 151 constitute a current calculating circuit 200 that calculates the inverter output current for removing distortion components contained in each phase power source of induction motor 106.

Next, the operation of the embodiment of this invention constructed as above will be described with reference to the waveforms of FIGS. 9A–G and FIGS. 10A–G.

In FIGS. 9A–G, IDG (FIG. 9(A)) is a DC current that flows into inverter 123, VDG (FIG. 9(A)) is a DC input voltage of inverter 123, and IUG (FIG. 9(B)) is a U-phase output current of inverter 123. A V-phase output current and a W-phase output current of inverter 123 have the same waveform as current IUG, lagging in phase by 120° and 240°.

IDS (FIG. 9(C)) is a DC current flowing into inverter 104, VDS (FIG. 9(C)) is a DC input voltage of inverter 104, and IUS (FIG. 9(D)) is a U-phase output current of inverter 104. A V-phase output current and a W-phase output current of inverter 104 have the same waveform as current IUS, lagging in phase by 120° and 240°. IU (FIG. 9(E)) is a resultant current of U-phase output currents of inverter 104 and inverter 123, and the value of IU is the total value of currents IUG and IUS.

I1U (FIG. 9(F)) is a primary current of the U-phase of induction motor 106 and has a waveform obtained by filtering resultant current IU by capacitor 137. A V-phase primary current I1V and a W-phase primary current I1W of induction motor 6 have the same waveform as current I1U, with a phase delayed by 120° and 240° with respect to current I1U. V1UV (FIG. 9(F)) is a UV-phase between-line voltage of induction motor 106. A VW-phase between-line voltage and a WU-phase between-line voltage of induction motor 106 have the same waveform as voltage V1UV, delayed in phase by 120° and 240° with respect to voltage V1UV. TQ (FIG. 9(G)) is a torque generated by induction motor 106; it can be seen that this has very little ripple.

Next, the circuit construction of the embodiment of this invention is described in detail.

First of all, primary currents I1U, I1V and I1W of U, V and W phases of induction motor 106 are detected by current detectors 139, 140, 141, respectively, and are input to three-phase/two-phase converter 143.

Three-phase/two-phase converter 143 is constituted by an adder and a multiplier (not shown) end performs the calculation:

$$I1A = I1U - (I1V + I1W)/2$$

$$I1B = (I1V - I1W) \cdot 1.732/2$$

thereby converting currents I1U, I1V and I1W on the U, V and W co-ordinates to currents I1A, I1B on the A, B co-ordinates. Here, axis A is an axis parallel to axis U, and axis B is an axis advanced by 90° with respect to axis A. The waveforms of currents I1A and I1B are shown in FIGS. 10A–G.

Outputs I1A, I1B of three-phase/two-phase converter 143 are input to co-ordinate converter 144. Co-ordinate converter 144 is constituted by a sine function calculator (not shown) and calculates:

$$I1D = I1A \cdot \cos(-TH2) - I1B \cdot \sin(-TH2)$$

$$I1Q = I1B \cdot \cos(-TH2) + I1A \cdot \sin(-TH2)$$

Here, TH2 is a phase angle of a secondary magnetic flux of induction motor 106.

By the above calculation, currents I1A and I1B on the A, B co-ordinates are converted to quantities I1D, and I1Q on the D, Q co-ordinates that rotate synchronously with phase angle TH2 of secondary magnetic flux of induction motor 106. Phase angle TH2 of the secondary magnetic flux of induction motor 6 is found in speed control circuit 145 as the sum of the phase angle of the rotor of the induction motor 106 detected by rotation detector 142 and the phase angle of slip to be applied to the induction motor 106. The waveform of components I1D and I1Q are shown in FIG. 10(B).

Figure 10A:
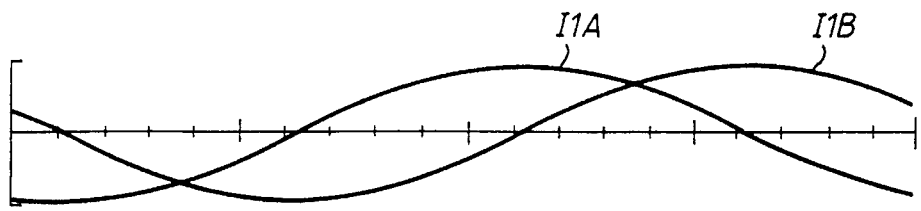
FIGS. 10A–G is a waveform diagram showing the operation of the embodiment shown in FIG. 8.
Figure 10B:
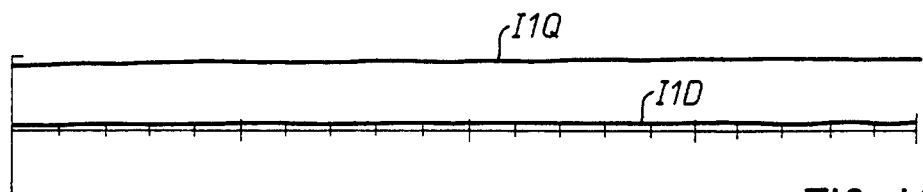
Figure 10C:
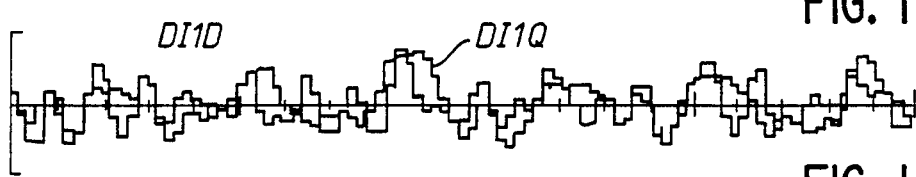

As can be seen from FIG. 10(B), the fundamental wave of components I1D and I1Q is DC. So, by detecting the rate of change of components I1D and I1Q, the distortion components present in components I1U, I1V and I1W can easily be extracted. Accordingly, components I1D and I1Q are supplied to differentiation circuit 148, which respectively detects DI1D as a rate of change of components I1D and DI1Q as a rate of change of component I1Q. The waveforms of change rates DI1D and DI1Q are shown in FIG. 10(C).

Figure 10D:
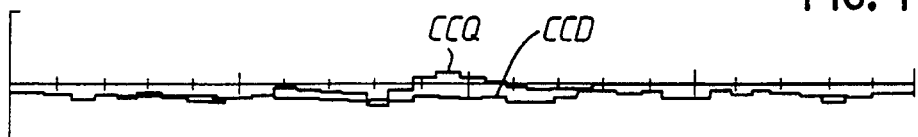

By performing a PI calculation in which a D axis current instruction ID of induction motor 106 supplied from speed control circuit 45 and D axis component I1D of the primary current of induction motor 106 obtained by co-ordinate converter 144 are compared by current control circuit 147, a D axis control signal CCD is obtained at the output. Likewise, a Q axis control signal CCQ can be obtained from a Q axis current instruction IQ of induction motor 106 and Q axis component I1Q of the primary current of induction motor 106. The waveforms of signals CCD and CCQ are shown in FIG. 10(D).

Outputs DI1D, DI1Q of differentiating circuit 148 and outputs CCD, CCQ of current control circuit 147 are applied to adder 149 to obtain components CD and CQ by the following calculation.

$$CD=DI1D+CCD$$

$$CQ=DI1Q+CCQ$$

Figure 10E:
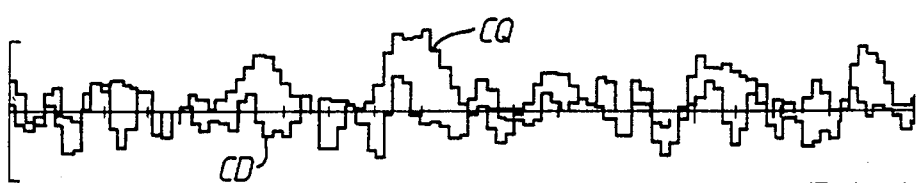

The waveforms of components CD and CQ are shown in FIG. 10(E).

Outputs CD and CQ of adder 149 are then input to co-ordinate converter 50, which performs the calculation to obtain components CA and CB:

$$CA=CD \cdot \cos (TH2) - CQ \cdot \sin (TH2)$$

$$CB=CQ \cdot \cos (TH2) + CD \cdot \sin (TH2)$$

By this calculation, components CD and CQ on the D, Q co-ordinates that rotate synchronously with phase angle TH2 of the secondary magnetic flux are returned to components CA, CB on the A, B co-ordinates, which are the original stationary co-ordinates.

Next, outputs CA and CB of co-ordinate converter 150 are input to two-phase/three-phase converter 151. Two-phase/three-phase converter 151 is constituted by an adder and a multiplier (not shown), and performs the following calculations to obtain current components CU, CV and CW:

$$CU=CA/1.5$$

$$CV=(-0.5 \cdot CA+0.866 \cdot CB)/1.5$$

$$CW=(-0.5 \cdot CA-0.866 \cdot CB)/1.5$$

Figure 10F:
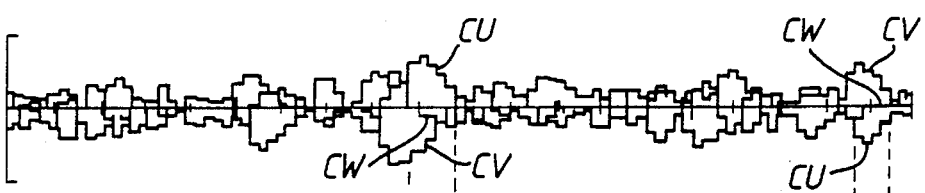

Thus, components CA and CB on the A, B co-ordinates are converted to components CU, CV and CW on the U, V and W co-ordinates. The waveforms of components CU, CV and CW are shown in FIG. 10(F).

Figure 10G:
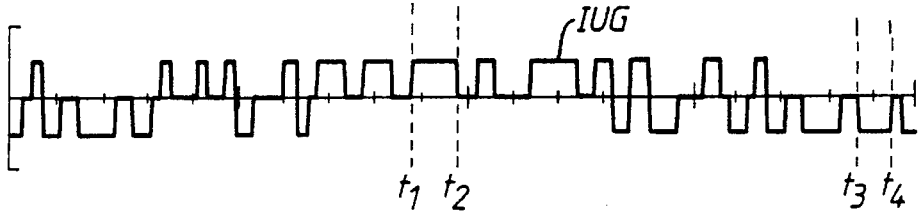

Components CU, CV, and CW are then supplied to inverter control circuit 152, which controls GTOs 131–136 of inverter 123. For example, in the period from a time-point t1 to a time-point t2 in FIGS. 10A–G, CU is larger than CV and also CU is larger than CW. During this period, therefore, GTO 131 of the U phase is ON and GTO 132 of the V phase and GTO 133 of the W phase are OFF. Consequently, as shown in FIG. 10(G), as U-phase current IUG of inverter 123, a positive current equal to DC input current IDG flows. Also, in the period from a time-point t3 to a time-point t4, CU is smaller than CV and also CU is smaller than CW, so in this period GTO 134 of the X phase is ON while GTO 135 of the Y phase and GTO 136 of the Z phase are OFF. Consequently, as shown in FIG. 10(G), as U phase current IUG of inverter 123, a negative current equal to DC input current IDG flows. The same applies to the V phase and the W phase.

With the embodiment of this invention as described above, stable operation can be achieved without the resonance phenomenon caused by capacitor 137 occurring, and induction motor 106 can be operated consuming the lagging reactive power. Thus, the AC output current can be controlled to a sine waveform as shown at I1U of FIG. 9(F), so the torque generated by induction motor 106 has a waveform as shown by TQ and control can be performed with little ripple.

The conversion and calculation processes performed by each of these units or circuits shown in FIG. 8 are executed by a microprocessor.

Hereinabove the case was described in which an induction motor was used as the load in the construction of FIG. 8. However, the load is not restricted to being an induction motor and a synchronous motor could be used. Also, the power conversion system could be connected to an ordinary power system. Furthermore, although the case was described in which converter 122 was constituted by thyristor converters, converter 122 could be constituted by GTO converters.

Figure 11:
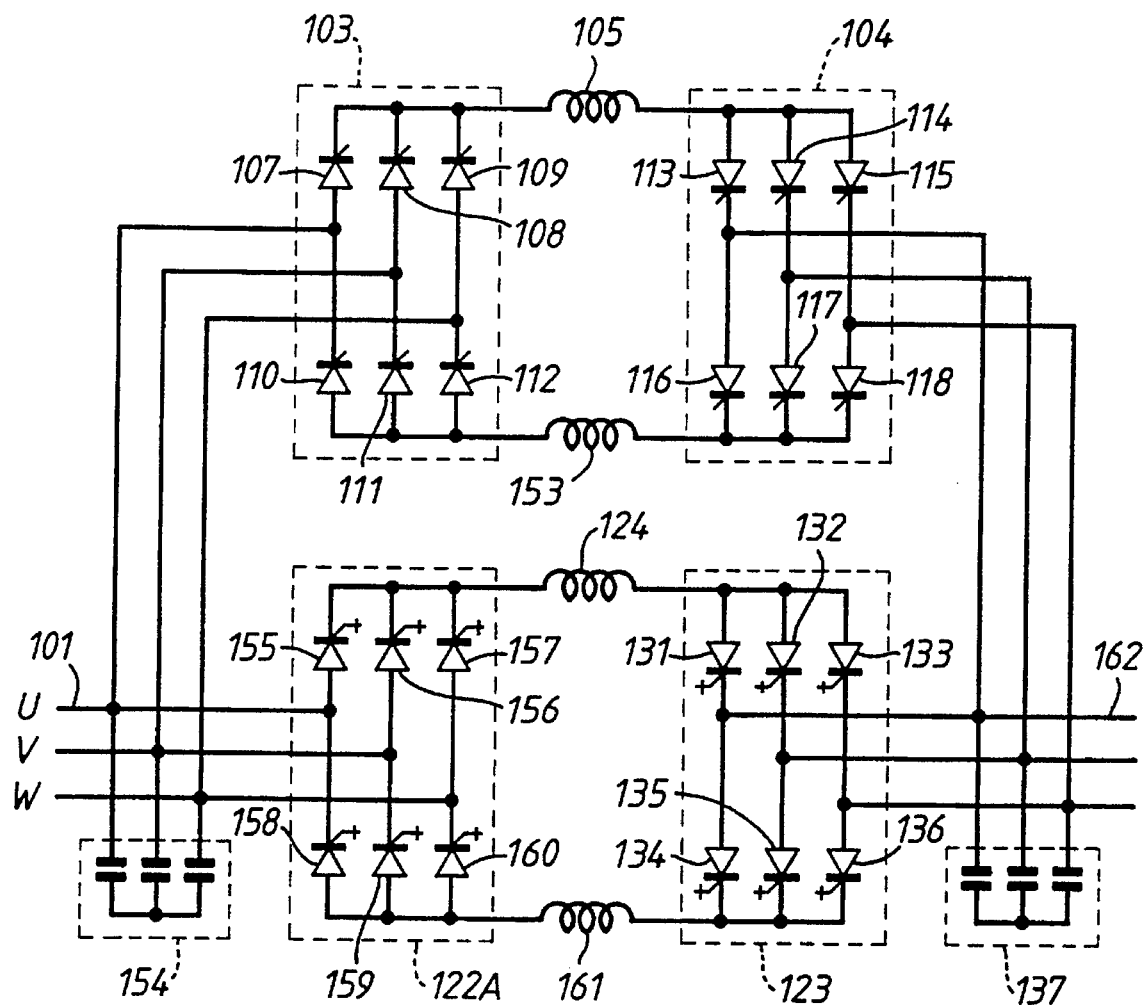
FIG. 11 is a layout diagram showing a power conversion system according to another embodiment of this invention.

FIG. 11 is a layout diagram of a power conversion system of another embodiment of this invention. In FIG. 11, reference numerals 101, 103–105, 107–118, 123, 124, 131–137 designate the same as in FIG. 8. 122A is a converter constituted by GTOs and is provided instead of converter 122 in FIG. 8. 155–160 are GTOs. 154 is a capacitor that absorbs the surge voltage when GTOs 155–160 are turned OFF. 153 is a DC reactor that smooths the DC current flowing from converter 103 to inverter 104. 161 is a DC reactor that smooths the DC current flowing from converter 122A to inverter 123. 162 is a power source.

In the above construction, converter 122A is controlled in the same way as inverter 23. That is, although not shown in the drawings, current detectors 139, 140, 141 and current calculation circuit 200 constituted by reference numerals 143, 144, 147–151 in FIG. 8 are provided on both sides of power source 101 and power source 162.

With the above-described construction, the power conversion system can perform exchange of power in both directions i.e. supply of power from power source 101 to power source 162 and supply of power from power source 162 to power source 101.

Figure 12:
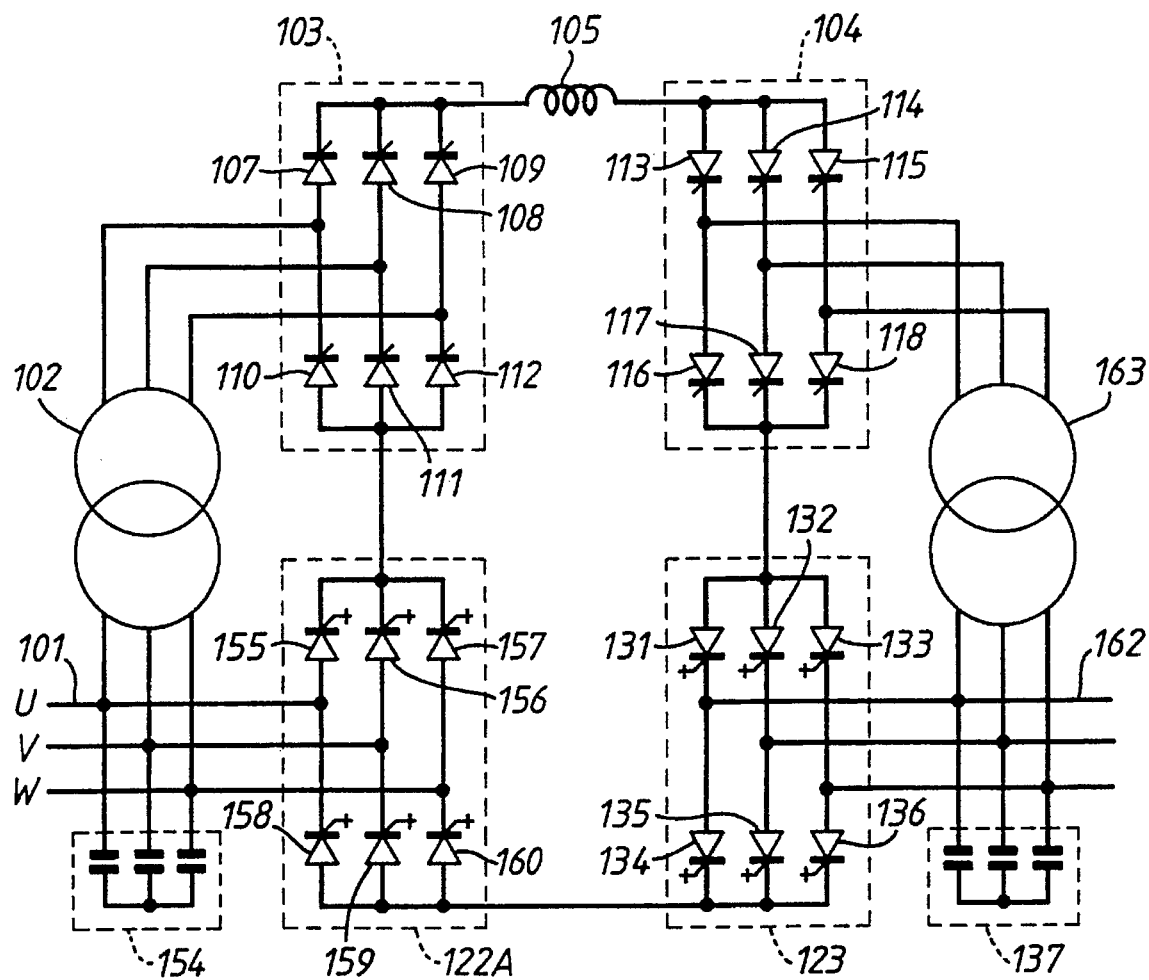
FIG. 12 is a layout diagram showing a power conversion system according to still another embodiment of this invention.
Figure 13:
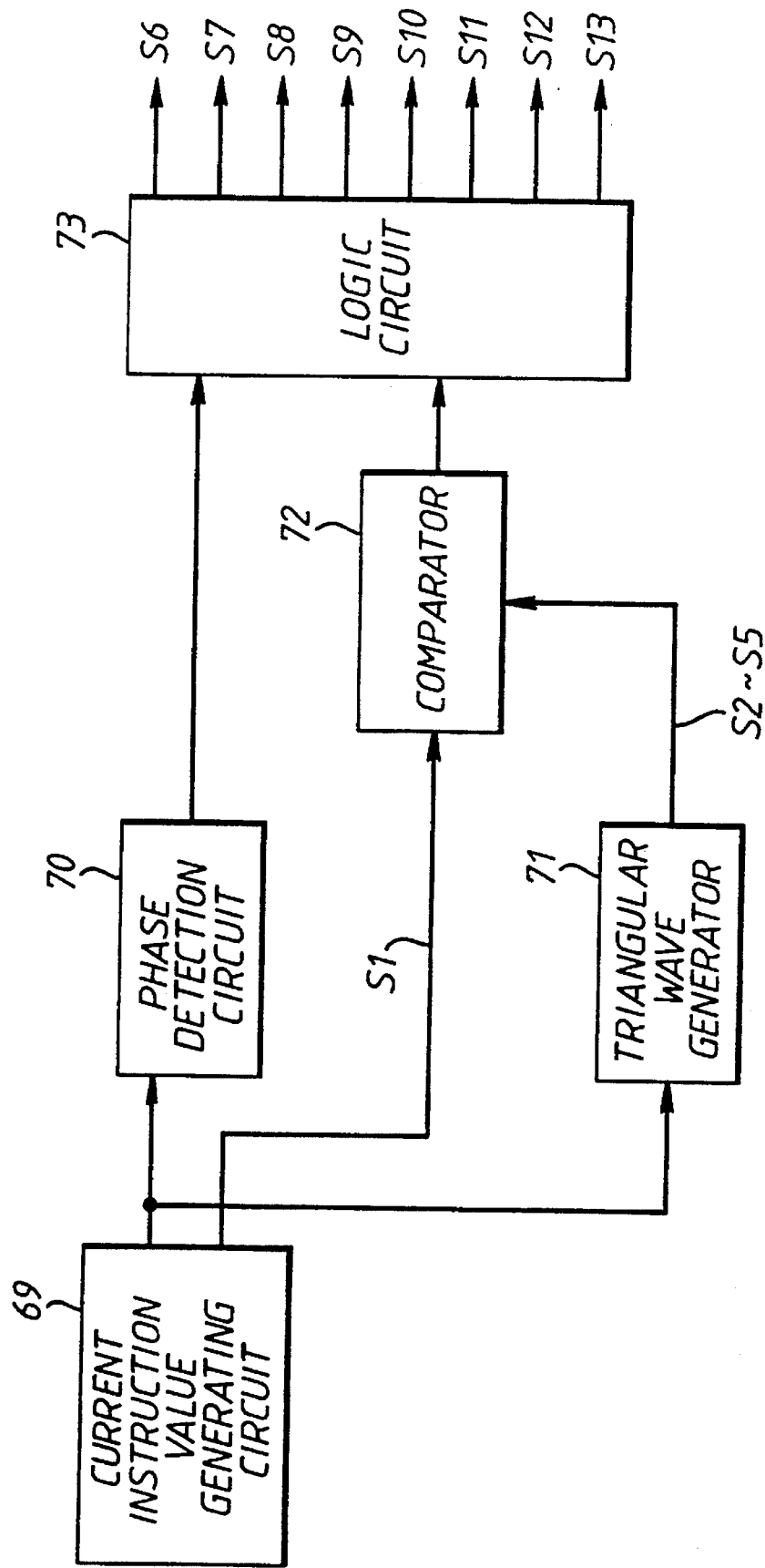
FIG. 13 is a layout diagram showing a prior art control device for a power conversion system.
Figure 14A:
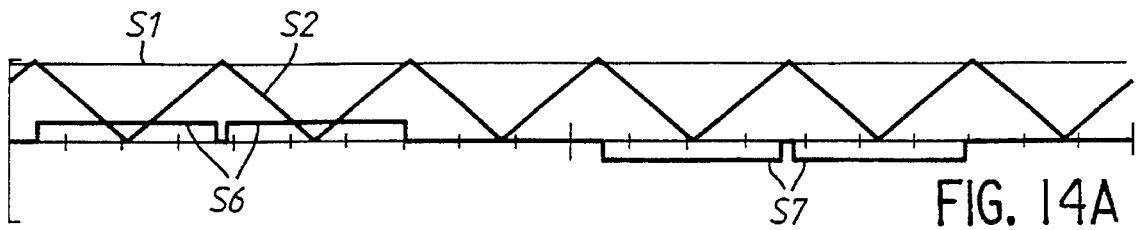
FIGS. 14A–E is a waveform diagram showing the operation of the prior art control device shown in FIG. 13.
Figure 14B:
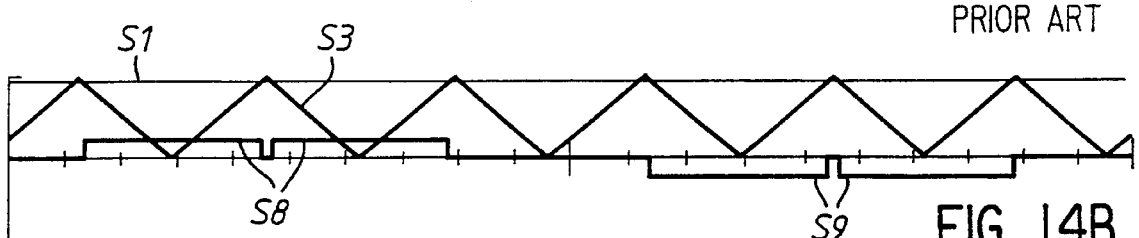
Figure 14C:
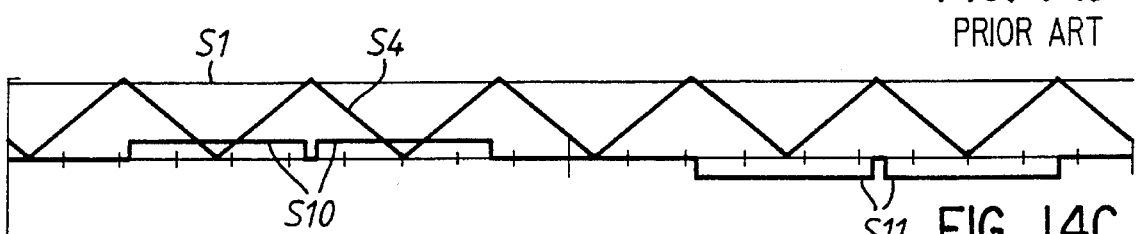
Figure 14D:
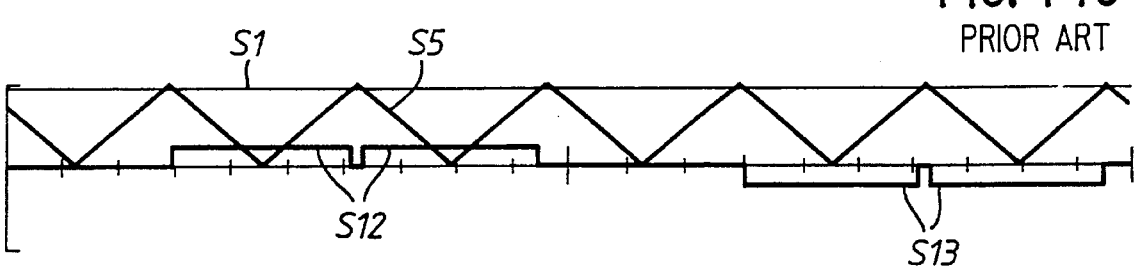
Figure 14E:
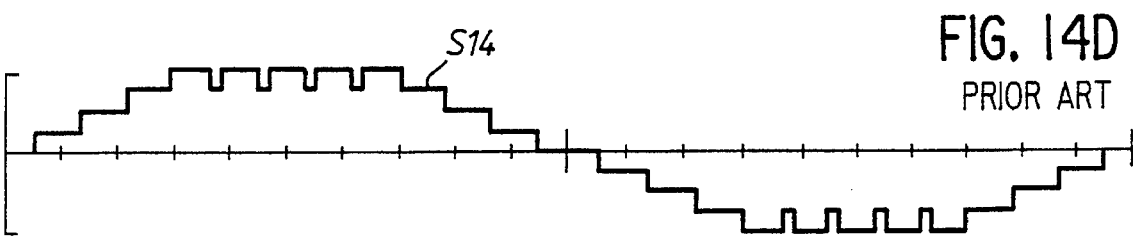
Figure 15:
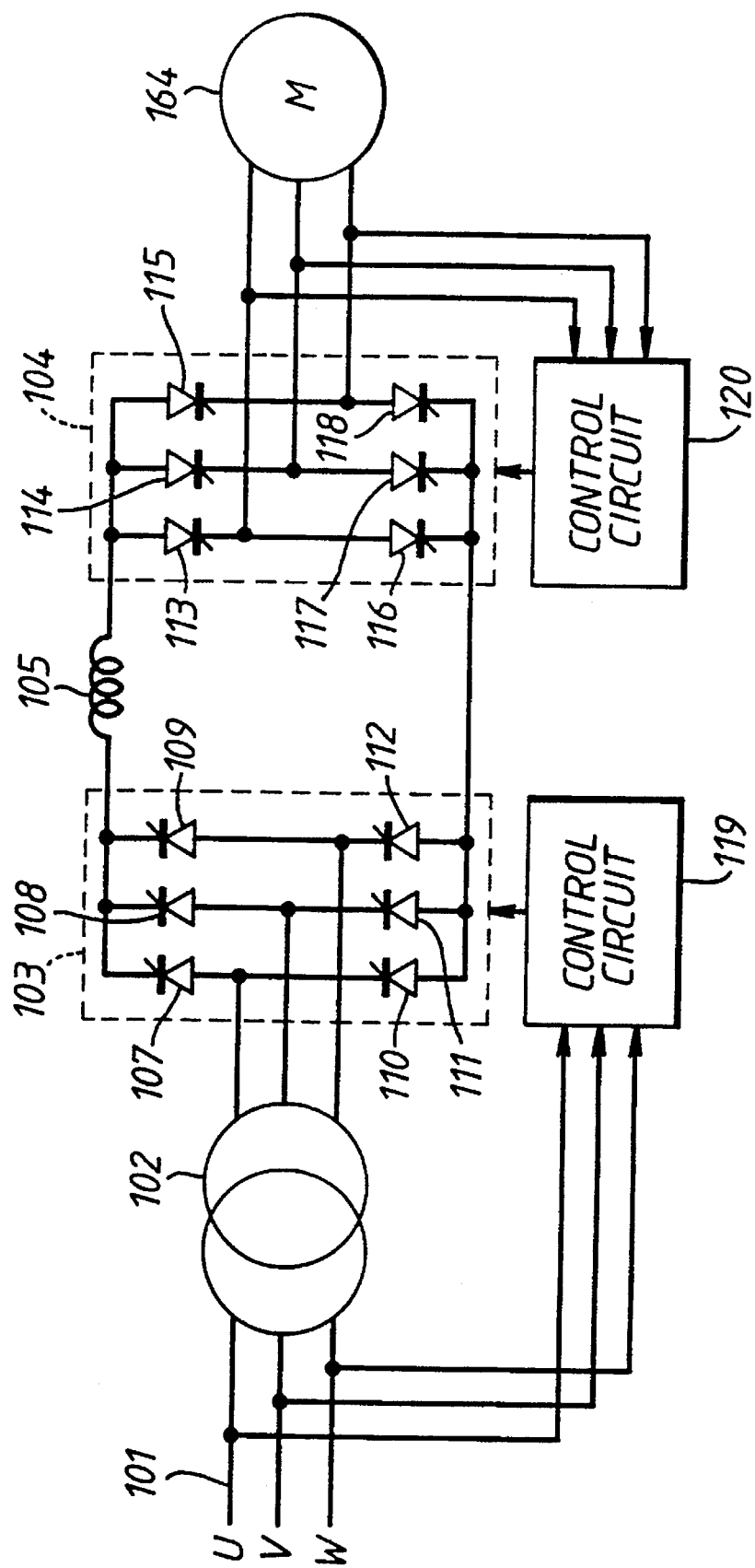
FIG. 15 is a layout diagram showing a prior art power conversion system.

FIG. 12 is a layout diagram of a power conversion system according to another embodiment of this invention. In FIG. 12, reference numerals 101, 103–105, 107–118, 123, 131–137, 154–160, and 162 designate the same as in FIG. 8. Reference numeral 122A designates the same as in FIG. 11. 102A is a transformer for insulating the AC sides of converter 103 and converter 122A. 163 is a transformer for insulating the AC sides of inverter 104 and inverter 123.

Also, the negative terminal of converter 103 and the positive terminal of converter 122A are connected, and the positive terminal of inverter 104 and the negative terminal of inverter 123 are connected. It should be noted that in the case of FIG. 12, the current detectors and current calculating circuits are provided on both sides of power source 101 and power source 162, as in the case of FIG. 11.

With this construction of FIG. 12, a DC circuit adapted to high-voltage use can be formed by series-connected converter 103 and converter 122A, and series-connected inverter 104 and inverter 123. Power conversion system with the construction of FIG. 12 therefore is suitable for the application to DC transmission etc.

As described above, with this invention, a construction is achieved wherein, by combining a first power converter of the current source type and a second power converter of the current source type including at least a self-commutated inverter, the distortion components present in the output current from the second power converter can be detected and current control of the second power converter such as to suppress such distortion components can be achieved; thus power can be supplied wit little pulsation whether the load is leading-phase or lagging-phase, with a low-cost construction.

As described above, according to this invention a control device for a power conversion system composed of a plurality of converters can eliminate low-order higher harmonics by controlling the total AC output current thereof to an instruction value.

This invention can also provide a power conversion system composed of a plurality of converters which can supply power with little pulsation to a load or a power source.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a power conversion system with a plurality of power converters, each of which is provided with a DC power source, a DC reactor and a unit converter composed of self-turn-off switching devices with DC terminals connected to said DC power source through said DC reactor, in which AC terminals of said plurality of unit converters are connected in common and is connected to an AC load, said control device comprising:

first means for generating an instruction value vector for an AC output current of said power conversion system;

second means for generating a set of actual value vectors showing all of said AC output currents that can be generated by said power conversion system;

third means for selecting a closest actual value vector that is closest to said instruction value vector out of said set of actual value vectors; and fourth means for controlling said self-turn-off switching devices in said plurality of said unit converters in response to said closest actual value vector;

whereby said AC output current of said power conversion system being controlled so as to track said instruction value vector.

2. The control device according to claim 1, wherein:

said first means generates said instruction value vector within a prescribed range of electrical angle;

said second means generates said set of said actual value vectors within said prescribed range of said electrical angle;

said third means selects said closest actual value vector within said prescribed range of said electrical angle; and said fourth means controls said self-turn-off switching devices in response to said closest actual value vector over all range of said electrical angle.

3. The control device according to claim 1, wherein said third means includes:

setting means for setting said set of regions, each of said regions being closest to one of said set of said actual value vectors, respectively;

selecting means for selecting a selected region out of said set of said regions in which said instruction value vector is; and determining means for determining said actual value vector included in said selected region as said closest actual value vector.

4. The control device according to claim 1, wherein said third means includes:

detecting means fop detecting said set of deviations between said instruction value vector and one of said set of said actual value vectors, respectively; and selecting means for selecting a smallest deviation that is smallest out of said set of said deviation; and determining means for determining said actual value vector having said smallest deviation as said closest actual value vector.

5. A control device for a power conversion system with a plurality of power converters, each of which is provided with a DC power source, a DC reactor and a unit converter with DC terminals connected to said DC power source through said DC reactor, in which AC terminals of said plurality of unit converters are connected in common and is connected to an AC load, said control device comprising:

current instruction value generating means for generating three phase AC current instruction values for said power conversion system;

current phase detecting means for detecting a maximum phase during a predetermined time period in which one of absolute values of said three phase AC current instruction values in maximum, and for generating said maximum phase and a polarity of said AC current instruction value of said maximum phase;

conduction arm number calculating means for determining numbers of conduction arms in said plurality of unit converters in each of three phases, based on the ratios of said respective three phase AC current instruction values and DC current of said DC power source, respectively;

conduction arm calculating means connected to receive said maximum phase, said polarity and said numbers of said conduction arms for generating a conduction instruction to said plurality of said unit converter, including, maximum phase current control means for generating a first conduction instruction for turning ON all arms of said unit converters decided by said maximum phase and said polarity, AC current control means for generating a second conduction instruction for sequentially turning ON arms of said unit converters of one phase of the remaining two phases which are not said maximum phase, and sequentially turning OFF the arms of said unit converters of the other phase, and bypass current control means for generating a third conduction instruction for turning ON an arm connected in series with said arm turned ON by said first conduction instruction in response to a sum of conducting arms of said remaining two phases in each of said unit converters, said conduction instruction including said first, said second and said third conduction instruction;

whereby output currents of said power conversion system being controlled so as to track said three phase AC current instruction values.

6. The control device according to claim 5, wherein:

said unit converter includes a three-phase GTO converter; and said conduction instruction is applied to GTO in said three-phase GTO converter to turn ON or turn OFF said GTO.

7. A power conversion system, comprising:

a first current source power converter including a first converter and a first inverter;

a second current source power converter including a second converter and a second inverter;

said second inverter being a self-commutated inverter;

an input of said first converter and an input of said second converter being connected to a power source;

a capacitor connected to an output of said first inverter and an output of said second inverter, and connected to one of a load and a power system;

current calculation means for detecting a distortion component of a current flowing into said one of said load and said power system and for calculating an output current reference of said second inverter such as to eliminate said distortion component; and inverter control means for controlling said second inverter based on said output current reference.

8. The power conversion system according to claim 7, further comprising:

a first transformer connected between said power source and said input of said first converter; and a second transformer connected between said power source and said input of said second converter.

9. The power conversion system according to claim 8, wherein:

said load includes a induction motor; and said second inverter includes a GTO inverter.

10. A power conversion system, comprising:

a first current source power converter including a first converter and a first inverter;

a second current source power converter including a second converter and a second inverter;

said second converter being a self-commutated converter;

said second inverter being a self-commutated inverter;

a first capacitor connected to an AC input of said first converter and an AC input of said second converter, and connected to a first power source;

a second capacitor connected to an AC output of said first inverter and an AC output of second inverter, and connected to a second power source;

first current calculation means for detecting a first distortion component of a current flowing from a first power source for calculating an AC input current reference of said second converter such as to eliminate said first distortion component;

converter control means for controlling said second converter based on said AC input current reference;

second current calculation means for detecting a second distortion component of a current flowing into a second power source for calculating an AC output current reference of said second inverter such as to eliminate said second distortion component; and inverter control means for controlling said second inverter based on said AC output current reference;

whereby exchanging power is both directions between said first and second power sources being capable.

11. The power conversion system according to claim 10, further comprising:

a first transformer connected between said first power source and said AC input of said first converter; and a second transformer connected between said second power source and said AC output of said first inverter;

wherein:

a negative terminal of said first converter is connected to a positive terminal of said second converter;

a positive terminal of said first inverter is connected to a negative terminal of said second inverter;

said first capacitor is connected to said AC input of said first converter through said first transformer; and said second capacitor is connected to said AC output of said first inverter through said second transformer.

* * * * *